United States Patent
Arakane et al.

(10) Patent No.: US 10,563,394 B2
(45) Date of Patent: Feb. 18, 2020

(54) BUILDING UNIT AND BUILDING

(71) Applicant: Panasonic Intellectual Property Management Co., Ltd., Osaka (JP)

(72) Inventors: Norihide Arakane, Osaka (JP); Kenji Ohsaka, Osaka (JP); Satoko Satou, Hokkaido (JP); Hitoshi Motoyama, Tokyo (JP); Nami Okazawa, Tokyo (JP); Hidekatsu Tsukamoto, Tokyo (JP); Yu Mitta, Osaka (JP); Takashi Tanaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/504,893

(22) PCT Filed: Jul. 6, 2015

(86) PCT No.: PCT/JP2015/003389
§ 371 (c)(1),
(2) Date: Feb. 17, 2017

(87) PCT Pub. No.: WO2016/038772
PCT Pub. Date: Mar. 17, 2016

(65) Prior Publication Data
US 2018/0195266 A1 Jul. 12, 2018

(30) Foreign Application Priority Data
Sep. 11, 2014 (JP) .................................. 2014-185713

(51) Int. Cl.
*E04B 1/348* (2006.01)

(52) U.S. Cl.
CPC ...... *E04B 1/34861* (2013.01); *E04B 1/34815* (2013.01); *E04B 1/34869* (2013.01)

(58) Field of Classification Search
CPC .. E04B 1/34815; E04B 1/348; E04B 1/34869; E04B 1/34861; E04B 2001/34892; E04H 1/04; E04H 1/005
See application file for complete search history.

(56) References Cited

U.S. PATENT DOCUMENTS 2,154,142 A * 4/1939 Whelan ..................... E03C 1/01
  52/184
3,256,652 A * 6/1966 Van Der Lely ......... E04B 1/348
  52/79.9

(Continued)

FOREIGN PATENT DOCUMENTS

JP   S57-16216 B2   4/1982
JP   H02-232445 A   9/1990

(Continued)

OTHER PUBLICATIONS

Search Report issued in corresponding International Patent Application No. PCT/JP2015/003389, dated Sep. 1, 2015.

*Primary Examiner* — Gisele D Ford
(74) *Attorney, Agent, or Firm* — McDermott Will & Emery LLP

(57) ABSTRACT

A building unit constitutes part of a two or more story building. The building unit includes: a first unit that is pre-assembled somewhere other than at a building site and constitutes one of a plurality of floors; a second unit that is pre-assembled somewhere other than at the building site and constitutes a floor above the first unit out of the plurality of floors; and a space path (upper and lower floor air circulation duct that spatially communicates with the first unit and the second unit.

8 Claims, 17 Drawing Sheets

(56) References Cited

U.S. PATENT DOCUMENTS

| | | | | |
|---|---|---|---|---|
| 3,292,327 A * | 12/1966 | Van Der Lely | ............ | B28B 5/10 52/79.13 |
| 3,430,398 A * | 3/1969 | Green | ................. | E04B 1/34861 52/263 |
| 3,616,592 A * | 11/1971 | Rothman | ............ | E04B 1/34869 52/125.6 |
| 3,656,266 A * | 4/1972 | Tylius | ...................... | E04B 1/04 52/185 |
| 3,750,366 A * | 8/1973 | Rich, Jr. | ............. | E04B 1/34807 52/79.11 |
| 3,755,974 A * | 9/1973 | Berman | .............. | E04B 1/34815 52/185 |
| 4,050,215 A * | 9/1977 | Fisher | ................. | E04B 1/34815 52/126.1 |
| 4,073,102 A * | 2/1978 | Fisher | ................. | E04B 1/34823 52/223.4 |
| 4,107,886 A * | 8/1978 | Ray | ......................... | E04B 1/162 52/431 |
| 4,118,905 A * | 10/1978 | Shelley | ............... | E04B 1/34823 52/236.4 |
| 4,194,339 A * | 3/1980 | Fisher | ................. | E04B 1/34823 52/223.1 |
| 4,364,206 A * | 12/1982 | Wybauw | ............ | E04B 1/3483 52/185 |
| 4,470,227 A * | 9/1984 | Bigelow, Jr. | ........ | E04B 1/34869 52/79.1 |
| 4,513,545 A * | 4/1985 | Hopkins, Jr. | ........... | E04B 1/348 52/745.03 |
| 6,578,330 B1 * | 6/2003 | Bergman | ............ | E04B 1/34823 52/234 |
| 6,826,879 B1 * | 12/2004 | Allen | ................... | E04B 1/34815 52/143 |
| 7,941,975 B2 * | 5/2011 | Ingjaldsdottir | ....... | E04B 1/3483 52/235 |
| 8,621,818 B1 * | 1/2014 | Glenn | ......................... | 52/220.1 |
| 9,249,566 B2 * | 2/2016 | Eggleston, II | ...... | E04B 1/34823 |
| 2003/0150178 A1 * | 8/2003 | Bergman | ............ | E04B 1/34823 52/234 |
| 2005/0262778 A1 * | 12/2005 | Allen | ................... | E04B 1/34815 52/79.1 |
| 2006/0185262 A1 * | 8/2006 | Abler | .................... | E04B 1/3442 52/64 |
| 2011/0056147 A1 * | 3/2011 | Beaudet | ................ | E04B 1/3483 52/79.9 |
| 2013/0067832 A1 * | 3/2013 | Collins | ..................... | E04B 1/24 52/125.1 |
| 2013/0152485 A1 * | 6/2013 | Austin | .................... | E04B 1/348 52/79.8 |
| 2014/0008996 A1 * | 1/2014 | Iwasa | ........................ | E04B 5/43 307/104 |
| 2014/0115976 A1 * | 5/2014 | Lippert | ................... | E04H 1/005 52/79.2 |
| 2014/0352232 A1 * | 12/2014 | Malakauskas | ...... | E04B 1/34869 52/79.9 |
| 2015/0240475 A1 * | 8/2015 | Malakauskas | ...... | E04B 1/34838 52/79.13 |
| 2017/0362814 A1 * | 12/2017 | Bergman | .................. | E04H 1/04 |

FOREIGN PATENT DOCUMENTS

| | | |
|---|---|---|
| JP | H09-200922 A | 7/1997 |
| JP | H11-230608 A | 8/1999 |
| JP | 2000-328663 A | 11/2000 |
| JP | 4974707 B2 | 7/2012 |

* cited by examiner

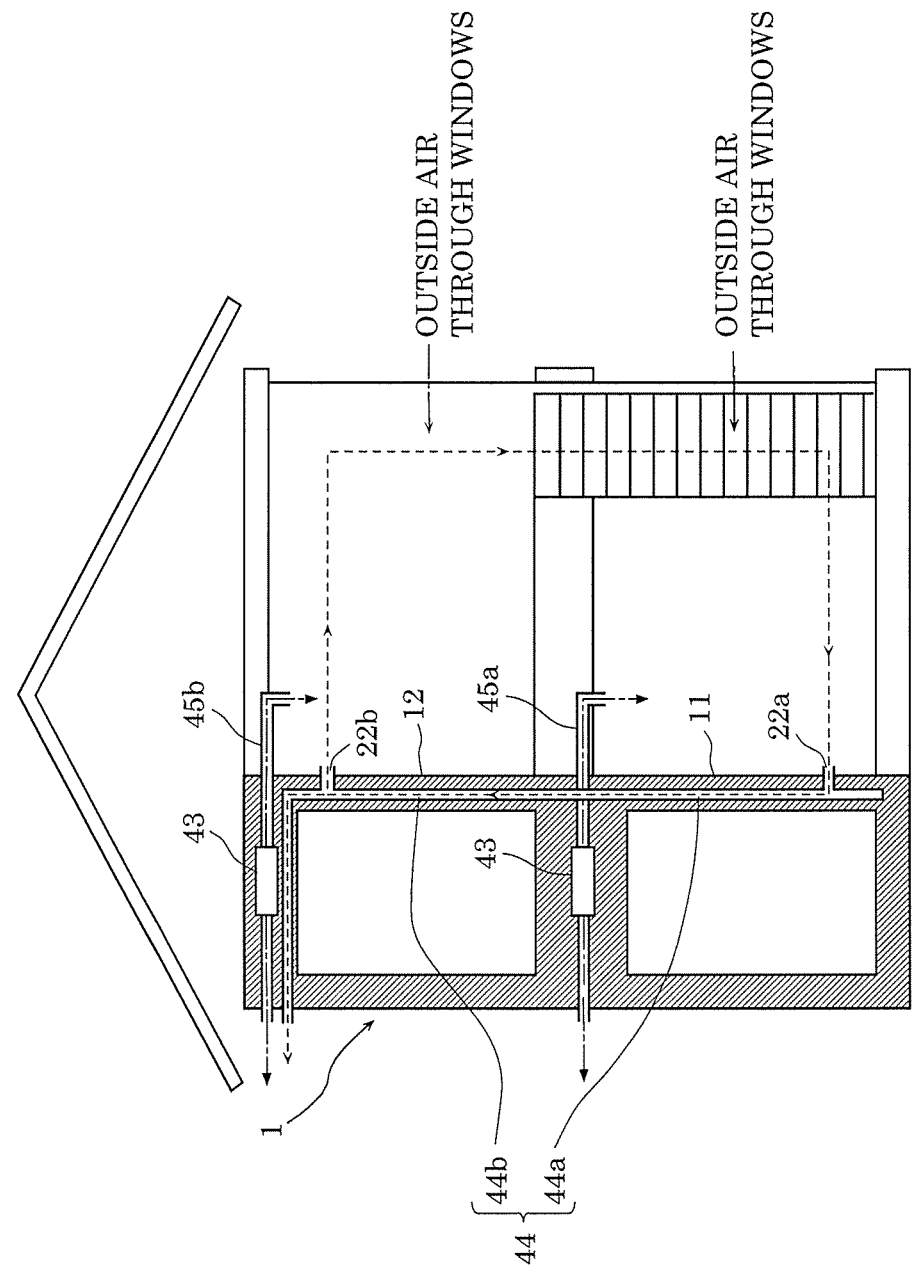

BUILDING UNIT AND BUILDING

CROSS REFERENCE

This application is the U.S. National Phase under 35 U.S.C. § 371 of International Application No. PCT/JP2015/003389, filed on Jul. 6, 2015, which claims the benefit of Japanese Application No. 2014-185713, filed on Sep. 11, 2014, the entire contents of each are hereby incorporated by reference.

TECHNICAL FIELD

The present invention relates to a building unit and a building including the building unit.

BACKGROUND ART

In general, a building such as a house is constructed at a building site. For instance, in the case of a wooden house, a framework is built on a concrete foundation at a building site using construction materials such as a beam and a pillar, and subsequently, housing equipment (equipment devices) such as water-related equipment and electrical equipment is installed.

Installation of the housing equipment at a building site may cause a variation in the quality and an increase in the cost. Thus, a technique in related art is known in which an equipment unit including a bathroom (modular bath) and a toilet is produced in a factory in advance, the equipment unit is transported to a building site, and the entrance, rooms and others are constructed on the site by a traditional construction method (PTL 1).

CITATION LIST

Patent Literature

PTL 1: Japanese Unexamined Patent Application Publication No. 2-232445

SUMMARY OF THE INVENTION

Technical Problem

In some cases, a building unit (equipment unit) is divided into multiple units and transported to a building site. For instance, for a building unit in a two-story structure, the first unit for the first floor and the second unit for the second floor are separately transported, and the two units are stacked one on top of the other at a building site, thereby completing a building unit in a two-story structure.

On the other hand, in a two or more story building, some are necessary for both upper and lower floors. For instance, a duct of an air conditioner and an electrical wire or the like are necessary for both upper and lower floors. In addition, the air itself in the building unit is necessary for both upper and lower floors. Like this, some are necessary for both upper and lower floors in a two or more story building.

However, when a building (such as a house) is completed at a building site based on a building unit as a core, in construction of a building unit in a two-story structure by stacking the first unit and the second unit, it may be difficult to install equipment in common with the first unit and the second unit as desired within the building unit.

The present invention has been made in order to solve such a problem, and it is an object of the present invention to provide a building unit in which even when multiple units are assembled at a building site to construct the building unit on the site, equipment in common with the multiple units can be installed as desired.

Solution to Problem

In order to solve the above-mentioned problem, an aspect of the present invention provides

Advantageous Effect of Invention

According to the present invention, equipment in common with the first unit and the second unit can be installed as desired in the building unit.

BRIEF DESCRIPTION OF DRAWINGS

FIG. 8 is a view schematically illustrating an air flow in a house which is built using the building unit according to the embodiment of the present invention.

DESCRIPTION OF EXEMPLARY EMBODIMENTS

Embodiment

Hereinafter, embodiments of the present invention will be described with reference to the drawings. Each of the embodiments described below illustrates a preferred specific example of the present invention. Therefore, numerical values, shapes, materials, structural components, the arrangement and connection of the structural components, assembly and processes (steps) of manufacturing or the sequence of the processes, etc., shown in the following embodiment are mere examples, and are not intended to limit the scope of the present invention. Therefore, among the structural components in the subsequent embodiment, components not recited in any one of the independent claims which indicate the most generic concept of the present invention are described as arbitrary structural components.

It is to be noted that the respective figures are schematic views and are not necessarily precise illustrations. Furthermore, in the respective figures, the same reference sign is given to substantially identical components, and redundant description is omitted or simplified.

(Building Unit)

Figure 1:
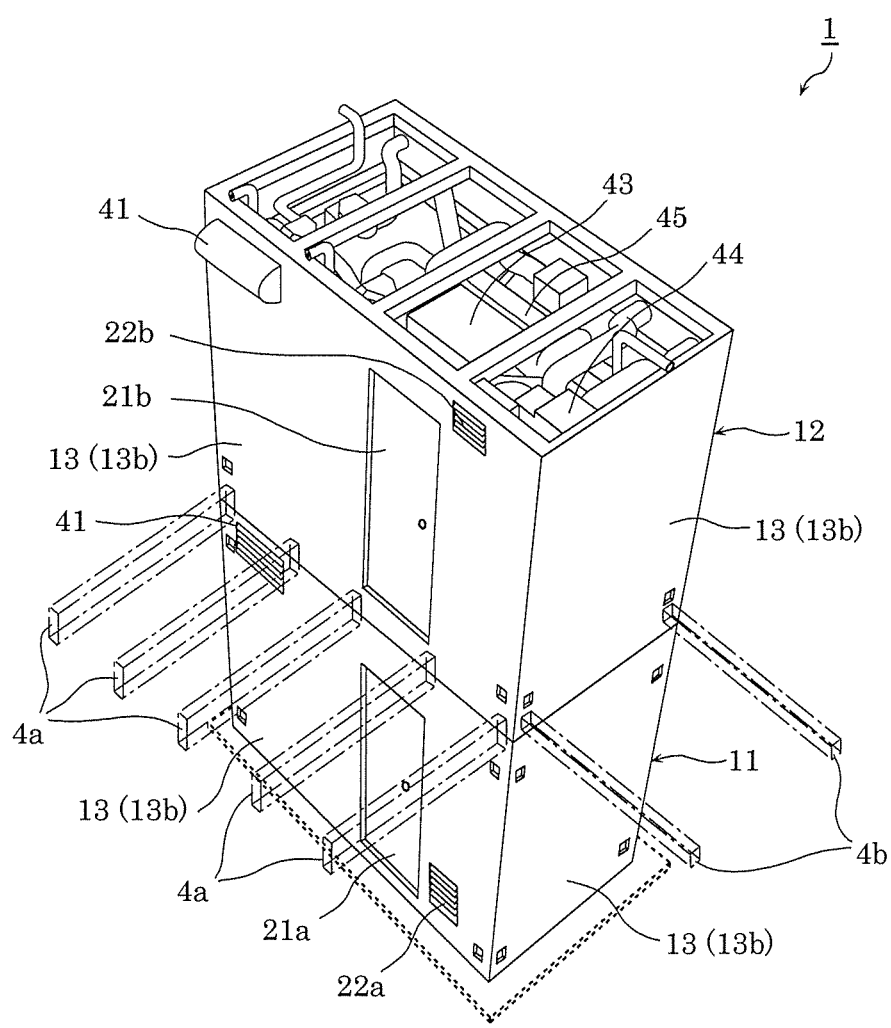
FIG. 1 is a perspective view of a building unit, as seen from a face on the indoor side, according to an embodiment of the present invention.
Figure 2:
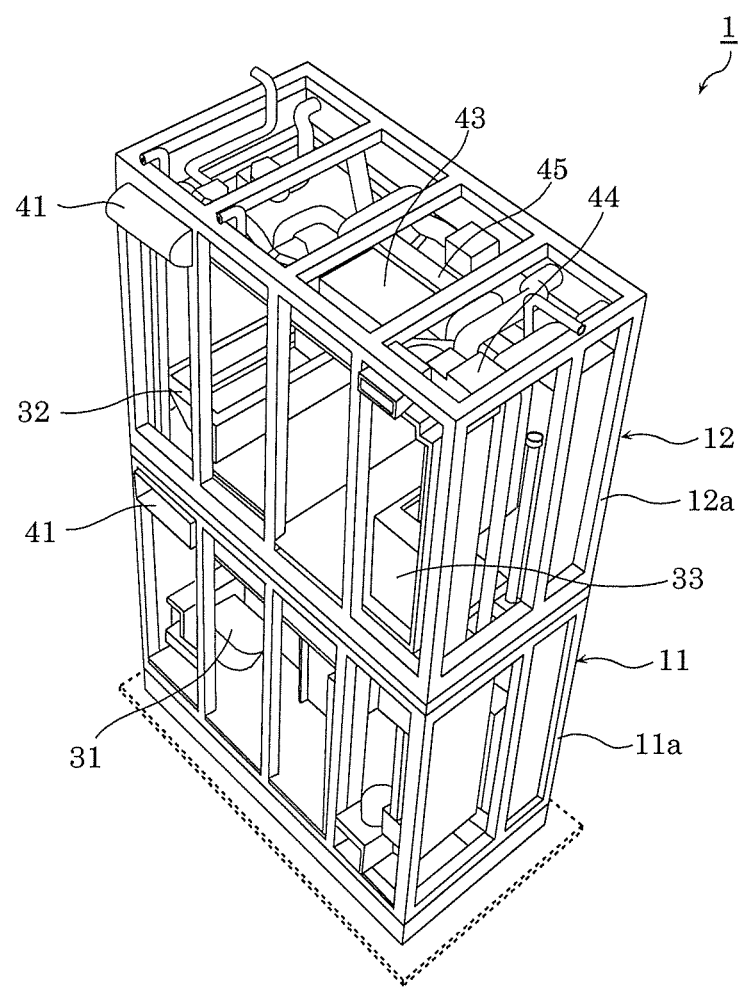
FIG. 2 is a view illustrating a construction structure and equipment of the building unit according to the embodiment of the present invention.
Figure 3:
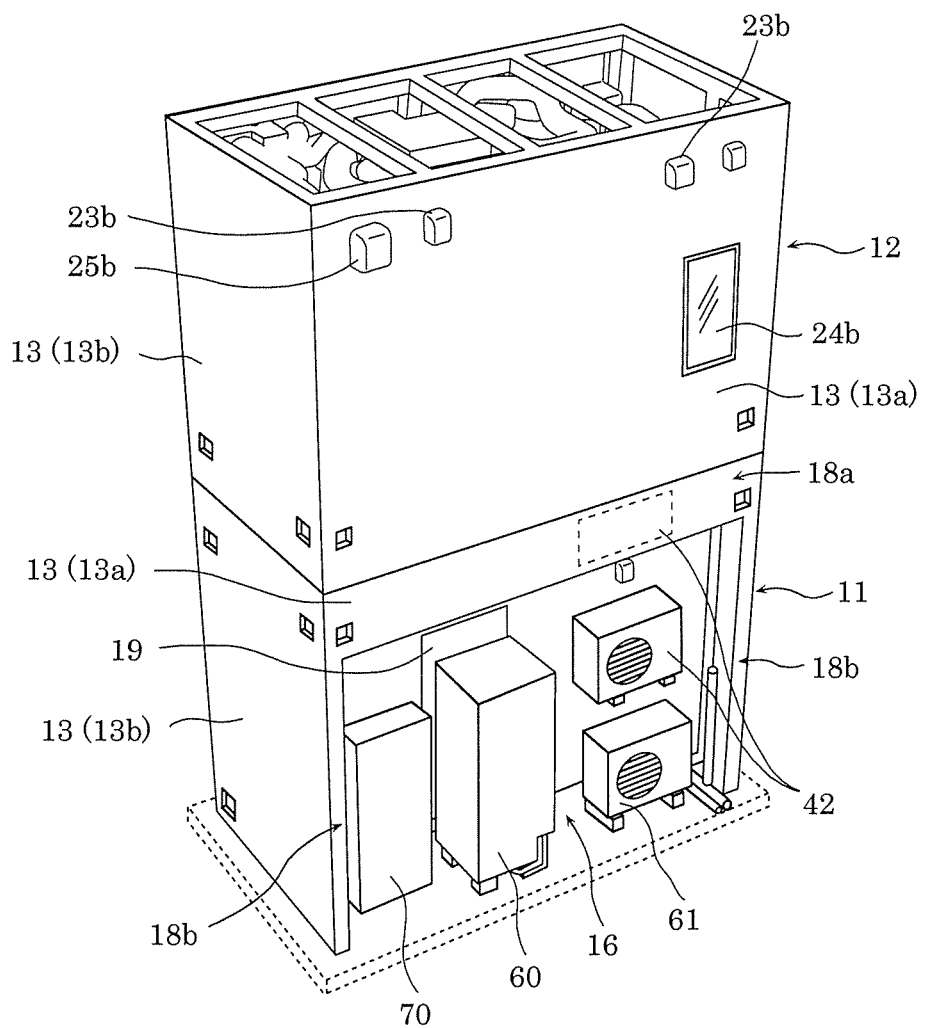
FIG. 3 is a perspective view of the building unit, as seen from a face on the outdoor side, according to the embodiment of the present invention.

First, the configuration of a building unit 1 according to the embodiment of the present invention will be described with reference to FIG. 1 to FIG. 3. FIG. 1 is a perspective view of a building unit, as seen from a face on the indoor side, according to the embodiment of the present invention. FIG. 2 is a view illustrating a construction structure and equipment of the building unit, where a wall base material of the building unit illustrated in FIG. 1 transparently illustrated. FIG. 3 is a perspective view of the building unit as seen from a face on the outdoor side.

Building unit 1 illustrated in FIG. 1 constitutes part of the building (structure), and has one or more units (module units) which are pre-assembled somewhere other than a building site, and various pieces of equipment related to the building. Building unit 1 in this embodiment is a core unit for constructing a building based on building unit 1 as the core. The building is, for instance, a house. However, the building may not be a house, such as a store, a factory or a warehouse.

The size of building unit 1 is 3640 mm×1820 mm (2 tsubo) in plan size, as an instance. It is to be noted that the dot-and-dash line illustrated in FIG. 1 indicates a building structure in a building when the building is constructed using building unit 1. Specifically, an example is illustrated in which five beams 4a are mounted on an outside face of building unit 1 as building structures, and two beams 4b are mounted on another outside face of building unit 1 as building structures.

Building unit 1 is a housing unit that constitutes part of a two or more story house, for instance, and is formed by stacking multiple pieces of a module unit that constitutes each of multiple floors. Building unit 1 in this embodiment constitutes part of a two or more story house, and is formed by stacking two module units, that is, first unit 11 and second unit 12 as illustrated in FIG. 1 to FIG. 3.

Also, building unit 1 is pre-assembled somewhere other than a building site, such as a factory (a site or a building) on a module-unit by module-unit basis. Specifically, each of first unit 11 and second unit 12 is pre-assembled in a factory, for instance. Like this, since first unit 11 and second unit 12 are industrialization units on which various pieces of equipment are pre-mounted in a factory, and thus units with high quality and high functionality can be manufactured at a low cost.

First unit 11 and second unit 12 assembled in a factory are transported to a building site by a delivery vehicle such as a truck, and are stacked one on top of the other as the building site and are connected and fixed.

First unit 11 is a module unit that constitutes one of multiple floors, and is a lower unit that constitutes the first floor of building unit 1 in this embodiment. Second unit 12 is a module unit that constitutes the other of multiple floors, and is an upper unit that constitutes the second floor of building unit 1 in this embodiment. That is, second unit 12 is a unit that constitutes the upper floor of first unit 11, and is a unit that constitutes the floor immediately above first unit 11 in this embodiment.

The height of first unit 11 and second unit 12 is set to such a height that does not exceed the height restriction imposed by the Road Traffic Act when first unit 11 and second unit 12 are placed on a loading platform of a delivery vehicle such as a truck on a unit by unit basis. In this embodiment, the height of first unit 11 is the same as the height of second unit 12, and the overall height is 2700 mm, as an instance.

The first unit 11 has building structure (framework structure) 11a used by, for instance, the wooden framework construction method. Similarly to first unit 11, second unit 12 has building structure (framework structure) 12a used by, for instance, the wooden framework construction method. Building structures 11a and 12a include a framework formed of building materials such as multiple pillars and horizontal members (such as beams), and a floor framework formed of building materials such as a joist. Building structures 11a and 12a are pre-assembled somewhere other than a building site, such as a factory.

It is to be noted that it suffices that building structures 11a and 12a have at least pillars, and the horizontal members such as beams may be incorporated at a building site and are not necessarily required. In this case, it is preferable to fix the multiple pillars using members other than the horizontal members, and multiple pillars can be fixed by bridging a base material (such as a structural plywood) such as a wall base material across the multiple pillars, for instance.

Also, each of building structures 11a and 12a is surrounded by four faces (outside faces) in top view. These four faces include a face on the outdoor side, that is, an outer wall face, and a face on the indoor side, that is, an inner wall face. In this embodiment, the four faces are formed of one face on the outdoor side and three faces on the indoor side.

The first unit 11 and second unit 12 can be fixed using, for instance, bolts and nuts. In this case, multiple bolts are inserted through the beams of the building structure 11a in first unit 11 and the beams of the building structure 12a in second unit 12, and are secured by nuts, thereby connecting and fixing first unit 11 and second unit 12.

Figure 4:
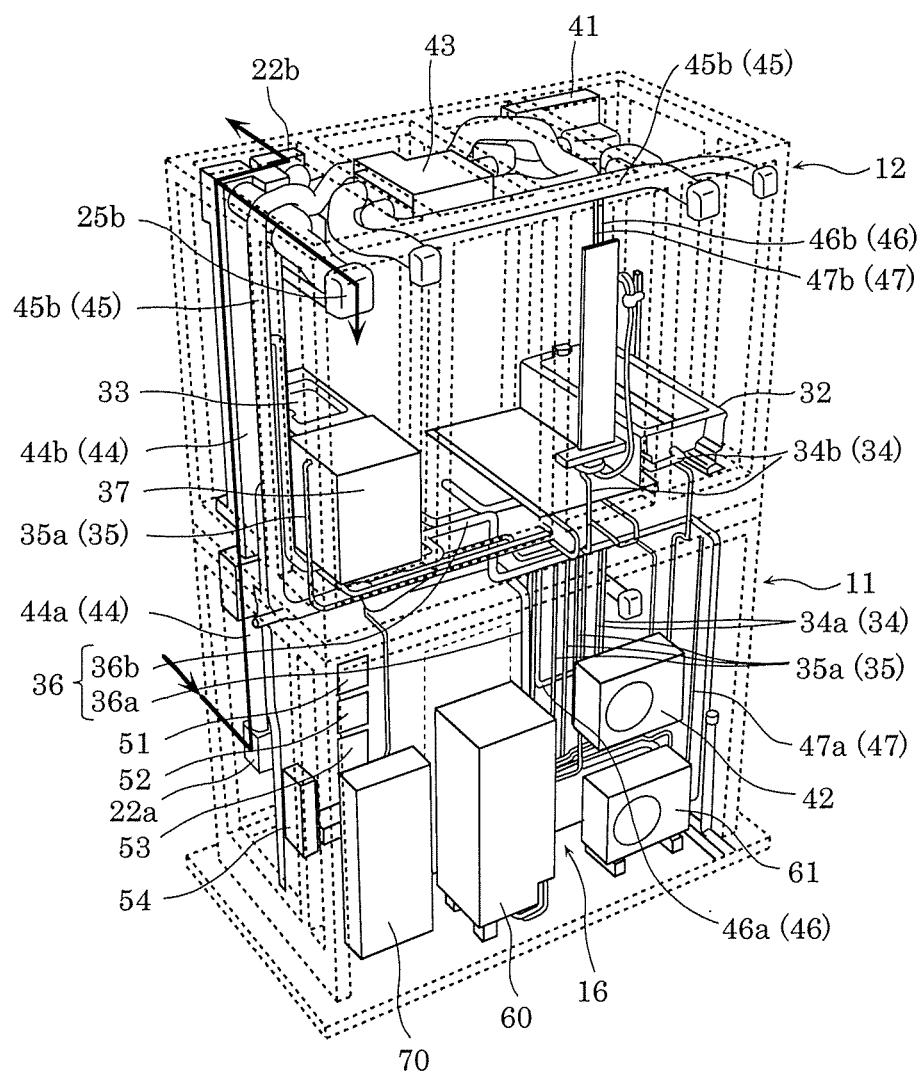
FIG. 4 is a view illustrating various pieces of equipment installed in the building unit illustrated in FIG. 1.
Figure 5:
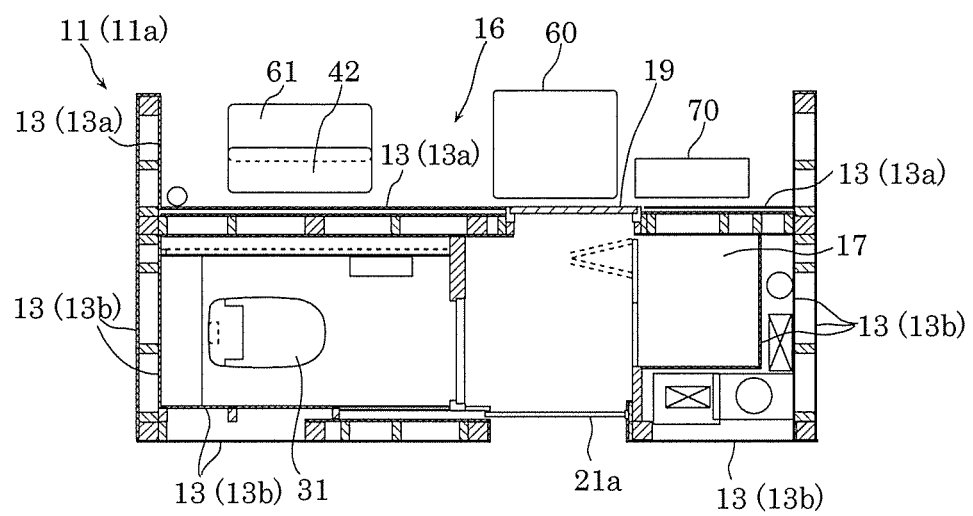
FIG. 5 is a sectional plan view of a first unit in the building unit according to the embodiment of the present invention.
Figure 6:
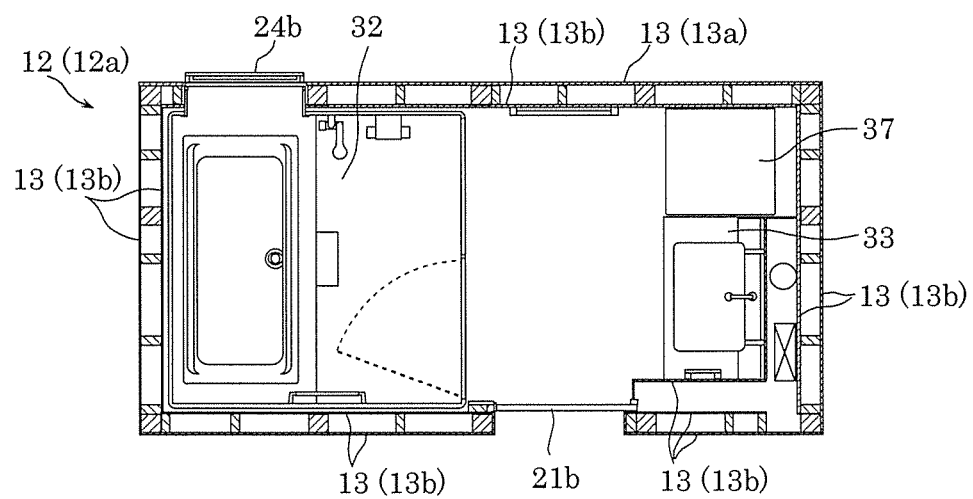
FIG. 6 is a sectional plan view of a second unit in the building unit according to the embodiment of the present invention.
Figure 7:
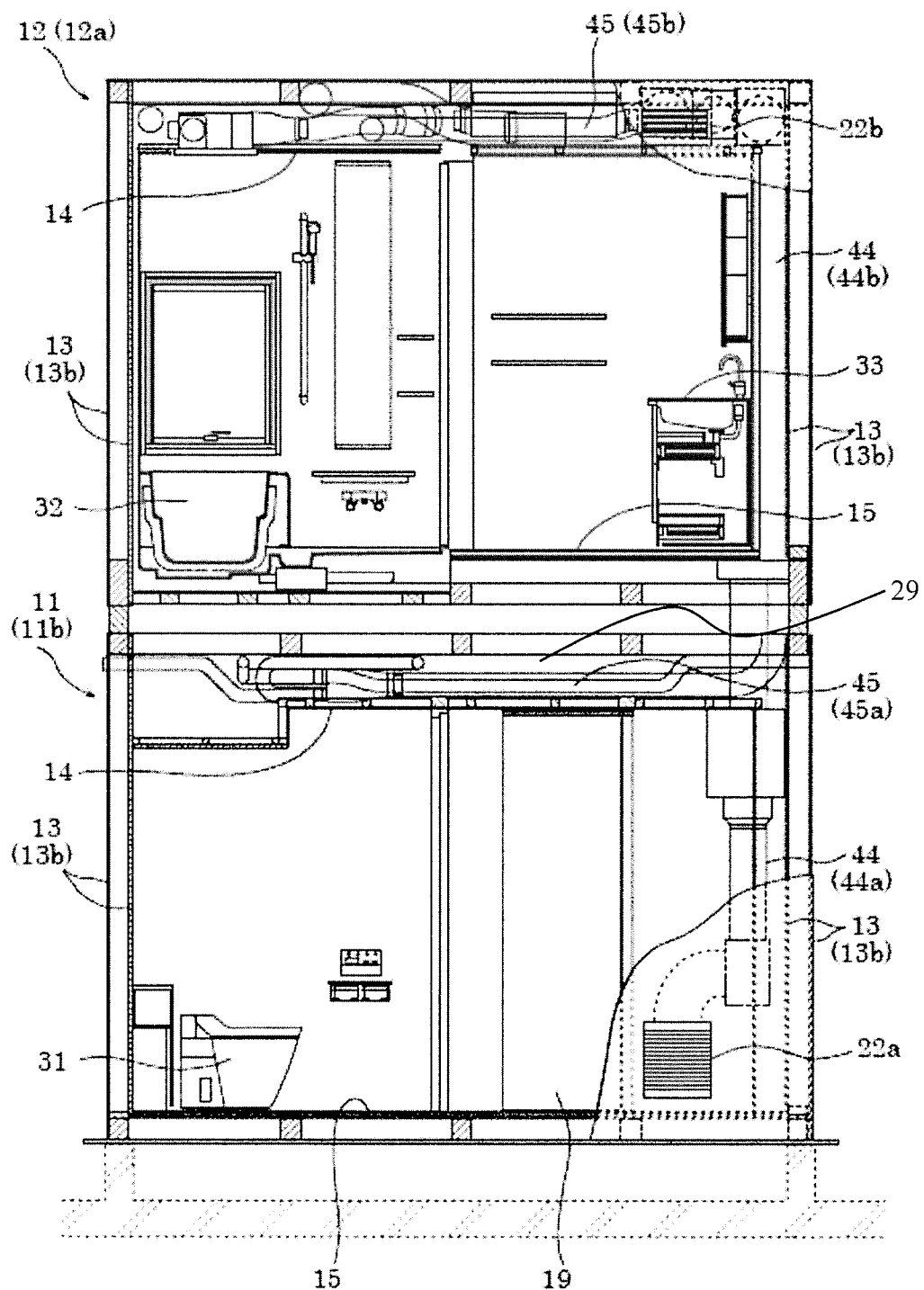
FIG. 7 is a sectional side view of the first unit and the second unit in the building unit according to the embodiment of the present invention.

Hereinafter, the configuration of first unit 11 and second unit 12 will be described in detail using FIG. 4 to FIG. 7 with reference to FIG. 1 to FIG. 3. FIG. 4 is a view illustrating various pieces of equipment installed in the building unit illustrated in FIG. 1. FIG. 5 is a sectional plan view of the first unit, FIG. 6 is a sectional plan view of the second unit, and FIG. 7 is a sectional side view of the first unit and the second unit.

It is to be noted that in FIG. 4 and others, regarding the symbols with which various pipes are labeled, all pipes in the same type are not necessarily labeled, and some pipes in the same type are not labeled with a symbol. In respective figures, the number and shape of beams and pillars in building structures 11a and 12a may not be strictly matched.

As illustrated in FIG. 1, FIG. 3, FIG. 5 to FIG. 7, first unit 11 and second unit 12 have wall base sheet 13 (outer wall base material 13a, inner wall base material 13b), ceiling base sheet 14 and floor base material 15. Wall base sheet 13, ceiling base sheet 14 and floor base material 15 are a plate material such as a structural plywood, a board or a panel, for instance, and are mounted on building structures 11a and 12a.

As an instance, as illustrated in FIG. 1 and FIG. 3, outer wall base material 13a is mounted on one outside face (face on the outdoor side) in which later-described recessed portion 16 is formed, and inner wall base material 13b is mounted on the other three outside faces (faces on the indoor side) out of the four outside faces of building structures 11a and 12a.

It is to be noted that in first unit 11 and second unit 12 in this embodiment, wall base sheet 13, ceiling base sheet 14 and floor base material 15 are pre-mounted in a factory before building structures 11a and 12a are constructed. However, wall base sheet 13, ceiling base sheet 14 and floor base material 15 may be mounted at a building site. In other words, building unit 1 does not include wall base sheet 13, ceiling base sheet 14 and floor base material 15 as illustrated in FIG. 2, and is formed of building structures 11a and 12a and equipment only.

After outer wall base material 13a is mounted, an outer wall such as a board wall, a painted wall or a curtain wall may be further constructed in outer wall base material 13a. Similarly, after inner wall base material 13b and ceiling base material 14 are mounted, an interior material such as a cloth or a tile may be constructed on inner wall base material 13b and ceiling base material 14, or after floor base material 15 is mounted, a flooring material such as a wooden floor or a tatami mat may be constructed on floor base material 15. It is to be noted that an outer wall, an interior material and a flooring material may be constructed in advance in a factory or constructed at a building site.

In addition, in this embodiment, as illustrated in FIG. 1, first unit 11 is provided with interior door 21a such as a sliding door, and ventilation opening 22a connected to upper and lower floor air circulation duct 44 (first air circulation duct 44a).

As illustrated in FIG. 1, second unit 12 is provided with interior door 21b such as a sliding door, and ventilation opening 22b connected to upper and lower floor air circulation duct 44 (second air circulation duct 44b). Furthermore, as illustrated in FIG. 3, second unit 12 is provided with outdoor hood 23b that covers the ventilation opening connected to second air supply and exhaust duct 45b, window 24b of modular bath 32, and outdoor hood 25b that covers the ventilation opening connected to upper and lower floor air circulation duct 44 (second air circulation duct 44b).

Next, the equipment installed in building unit 1 will be described in detail.

Building unit 1 has equipment (housing equipment) such as water-related equipment, air conditioning equipment and electrical equipment, and these pieces of equipment are pre-installed in building unit 1 at a place other than a building site, such as a factory. It is to be noted that it suffices that building unit 1 have at least one of these pieces of equipment.

The water-related equipment includes, for instance, an equipment device installed indoors to be used by a user, such as a modular bath (bathroom), a toilet, a washstand, and a kitchen, a hot-water supplier which converts water into hot water (hot-water supply system), and a water distribution pipe (a drain pipe, a water supply pipe and a hot-water supply pipe) installed in pipe space such as above the ceiling, under the floor or in a wall.

The air conditioning equipment includes, for instance, an air conditioning indoor machine such as an air conditioner installed indoors, an air conditioning outdoor machine such as an air conditioner installed outdoors, an equipment device such as a heat exchanger installed above the ceiling, and various pipes such as a duct installed in pipe space.

The electrical equipment includes a power distribution board, an information board, an operational board for operating an equipment device, a power generation and storage coordination device (power generation and storage coordination system), equipment device such as a lighting, and wiring equipment such as a switch, an outlet, and a wire (information wire, electrical wire). A power distribution board, an information board, an operational board, a power generation and storage coordination device, a lighting, a switch and an outlet are installed indoors. Also, wires such as an information wire, an electrical wire are installed above the ceiling, under the floor or in a wall.

Building unit 1 in this embodiment has a configuration in which primary equipment devices of a house are collected in a water related core on which pieces of water-related equipment are concentrated. Thus, most of equipment devices to be installed in a house can be stored in building unit 1 (2 tsubo in this embodiment), and thus large living space can be ensured even in a small house.

Specifically, as illustrated in FIG. 2, FIG. 4, FIG. 5 to FIG. 7, as water-related equipment, building unit 1 has toilet 31, modular bath 32, washstand 33, hot-water supply pipe 34, water supply pipe 35, and drain pipe 36.

Toilet 31, modular bath 32, and washstand 33 are connected to hot-water reservoir tank 60 of a hot-water supplier via hot-water supply pipe 34. In addition, toilet 31, modular bath 32, and washstand 33 are connected to water supply pipe 35 and drain pipe 36.

More specifically, as illustrated in FIG. 4, FIG. 5 and FIG. 7, first hot-water supply pipe (lower hot-water supply pipe) 34a, first water supply pipe (lower water supply pipe) 35a and first drain pipe (lower drain pipe) 36a are installed in first unit 11 that constitutes the first floor. On the other hand, as illustrated in FIG. 4, FIG. 6 and FIG. 7, toilet 31, modular bath 32, washstand 33, second hot-water supply pipe (lower hot-water supply pipe) 34b, second water supply pipe (lower water supply pipe) 35b and second drain pipe (lower drain pipe) 36b are installed in second unit 12 that constitutes the second floor. It is to be noted that in this embodiment, as illustrated in FIG. 4, washing machine 37 is installed in second unit 12, and second water supply pipe 35b is connected to washing machine 37.

These pieces of water-related equipment are pre-mounted on building structures 11a and 12a in a factory. Also, the water-related equipment is connected to waterworks via water supply pipe 35 by construction at a building site, and is connected to a sewage line via drain pipe 36. It is to be noted that it suffices that building unit 1 have at least one of these pieces of water-related equipment. In addition to these, building unit 1 may have other-water related equipment such as a kitchen.

As illustrated in FIG. 4, as the air conditioning equipment, building unit 1 has air conditioner (air conditioning indoor machine) 41, air conditioner outdoor machine (air conditioning outdoor machine) 42, total heat exchanger 43, upper and lower floor air circulation duct 44, air supply and exhaust duct 45, refrigerant pipe 46, and drain pipe 47.

As illustrated in FIG. 1, in this embodiment, the air conditioner 41 is installed in each of first unit 11 and second unit 12. As illustrated in FIG. 3, in accordance with two pieces of air conditioner 41, two pieces of air conditioner outdoor machine 42 are also provided.

Air conditioner 41 and air conditioner outdoor machine 42 are connected via refrigerant pipe 46. In addition, drain pipe 47 is connected to air conditioner 41 and air conditioner outdoor machine 42, and unnecessary water generated when an air conditioner is used is discharged to the outside of building unit 1 through drain pipe 47.

More specifically, as illustrated in FIG. 4 and FIG. 7, in first unit 11 that constitutes the first floor, there are installed first air circulation duct (lower air circulation duct) 44a, first air supply and exhaust duct (lower air supply and exhaust duct) 45a, first refrigerant pipe (lower refrigerant pipe) 46a, and first drain pipe (lower drain pipe) 47a. On the other hand, as illustrated in FIG. 4 and FIG. 7, in second unit 12, there are installed total heat exchanger 43, second air circulation duct (upper air circulation duct) 44b, second air supply and exhaust duct (upper air supply and exhaust duct) 45b, second refrigerant pipe (upper refrigerant pipe) 46b, and second drain pipe (upper drain pipe) 47b.

Each of upper and lower floor air circulation duct 44 and air supply and exhaust duct 45 is an example of space path that spatially communicates with first unit 11 and second unit 12. In upper and lower floor air circulation duct 44 and air supply and exhaust duct 45, gas such as air can flow in a certain direction. In this embodiment, each of upper and lower floor air circulation duct 44 and air supply and exhaust duct 45 is installed so as to extend over first unit 11 and second unit 12. Therefore, a gas such as air moves in a vertical direction in upper and lower floor air circulation duct 44 and air supply and exhaust duct 45.

Furthermore, in this embodiment, upper and lower floor air circulation duct 44 and air supply and exhaust duct 45 are spatially connected. That is, upper and lower floor air circulation duct 44 and air supply and exhaust duct 45 are connected, and air can move back and forth in the both.

Upper and lower floor air circulation duct 44 is a ventilation duct that communicates with each of the indoor space of first unit 11 and the indoor space of second unit 12. Specifically, as illustrated in FIG. 1 and FIG. 7, upper and lower floor air circulation duct 44 is connected to ventilation opening 22a provided in first unit 11 and ventilation opening 22b provided in second unit 12. Ventilation opening 22a is provided in wall base material 13 (inner wall base material 13b) of first unit 11, and ventilation opening 22b is provided in wall base material 13 (inner wall base material 13b) of second unit 12. The air in building unit 1 can circulate through the upper and lower floors via upper and lower floor air circulation duct 44 connected to ventilation opening 22a on the first floor and ventilation opening 22b on the second floor. In this case, air may be circulated using a fan or the like.

In this embodiment, upper and lower floor air circulation duct 44 is a vertical duct that is installed to extend in a vertical direction so as to extend over first unit 11 and second unit 12. Specifically, upper and lower floor air circulation duct 44 has first air circulation duct 44a installed to extend in a vertical direction in first unit 11, and second air circulation duct 44b installed to extend in a vertical direction in second unit 12. First air circulation duct 44a and second air circulation duct 44b are pre-mounted on the respective units at a place other than a building site, such as a factory, and first air circulation duct 44a and second air circulation duct 44b are connected at a building site and linked together. For instance, first air circulation duct 44a and second air circulation duct 44b are linked so as to be linear in a vertical direction from a lower portion of first unit 11 to an upper portion of second unit 12.

It is to be noted that upper and lower floor air circulation duct 44 is, for instance, a circulation duct, and may be provided with a circulation fan. In addition, upper and lower floor air circulation duct 44 (first air circulation duct 44a and second air circulation duct 44b) may be formed of multiple piping members.

Air supply and exhaust duct 45 is a duct that communicates with the outdoors and indoors of building unit 1. As illustrated in FIG. 2, air supply and exhaust duct 45 is connected to a ventilation opening (not illustrated) in outdoor hood 23b provided in second unit 12 via total heat exchanger 43. Air indoors and outdoors of building unit 1 are supplied and exhausted via air supply and exhaust duct 45 connected to outdoor hood 23b (ventilation opening).

In this embodiment, air supply and exhaust duct 45 has first air supply and exhaust duct 45a disposed in first unit 11, and second air supply and exhaust duct 45b disposed in second unit 12. First air supply and exhaust duct 45a and second air supply and exhaust duct 45b are pre-mounted on the respective units at a place other than a building site, such as a factory, and first air supply and exhaust duct 45a and second air supply and exhaust duct 45b are connected at a building site and linked together. It is to be noted that each of air supply and exhaust duct 45a and second air supply and exhaust duct 45b is formed of multiple ducts to be shunted.

Air supply and exhaust duct 45 is further connected to total heat exchanger 43. Total heat exchanger 43 is an example of a heat exchanger that exchanges heat between the outdoor air (outside air) of building unit 1 and the indoor air (inside air), and also exchanges moisture therebetween.

As mentioned above, these pieces of air conditioning equipment are pre-mounted on building structures 11a and 12a in a factory. It is to be noted that it suffices that building unit 1 have at least one of these pieces of air conditioning equipment, and may have air conditioning equipment other than these pieces of air conditioning equipment.

As illustrated in FIG. 4, as the electrical equipment, building unit 1 has distribution board 51, information board 52, operational board 53, and power generation and storage coordination device 54. Although not illustrated, as the electrical equipment, building unit 1 has a lighting, a switch, an outlet and a wire (information wiring, electrical wire).

More specifically, as illustrated in FIG. 4, FIG. 5 and FIG. 7, distribution board 51, information board 52, operational board 53, and power generation and storage coordination device 54 are installed in first unit 11 that constitutes the first floor. Distribution board 51, information board 52, operational board 53, and power generation and storage coordination device 54 are collectively stored in storage room 17 provided in first unit 11. Storage room 17 is provided beside recessed portion 16 of first unit 11.

These pieces of electrical equipment are pre-mounted on building structures 11a and 12a in a factory. It is to be noted that it suffices that building unit 1 have at least one of these pieces of electrical equipment, and may have electrical equipment other than these pieces of electrical equipment.

In this manner, water-related equipment, air conditioning equipment and electrical equipment may be installed in both first unit 11 and second unit 12, however, may be installed in either one of first unit 11 and second unit 12. In other words, water-related equipment, air conditioning equipment and electrical equipment may be installed in all floors, or only one of the floors. In the case of two or more floors, those equipment may be installed in multiple floors although not all floors. When water-related equipment is installed in the second or higher floor, water-related equipment is connected to a water distribution pipe which is plumbed to the lower floor.

Furthermore, building unit 1 in this embodiment has hot-water supply equipment (hot-water supply system) utilizing a heat pump using $CO2$ as a cooling medium. As illustrated in FIG. 3 and FIG. 4, as an outdoor machine, the hot-water supply equipment has hot-water supply outdoor machine 61 in which hot-water reservoir tank 60 and a heat pump unit are built. That is, hot-water reservoir tank 60 and hot-water supply outdoor machine 61 are installed outdoors. The water-related equipment installed indoors is connected to hot-water reservoir tank 60 via hot-water supply pipe 34.

Although not illustrated, hot-water supply outdoor machine 61 of a heat pump unit has a water heat exchanger connected to hot-water reservoir tank 60 via a water distribution pipe, and an air heat exchanger connected to the water heat exchanger via a refrigerant pipe.

Furthermore, as illustrated in FIG. 3 and FIG. 4, building unit 1 in this embodiment has power storage device (power station) 70 which is connected to the electrical equipment and via an electrical wire. Power stored in power storage device 70 is supplied to each piece of electrical equipment via an electrical wire as necessary. Power storage device 70 is installed, for instance outdoors. Power storage device 70 may be installed indoors. In addition, a power generator of power storage device 70 may be installed indoors, and a power storage of power storage device 70 may be installed outdoors, or the other way around.

Various pipes of first unit 11 correspond to various pipes of second unit 12. When first unit 11 and second unit 12 are stacked one on top of the other, the pipes of first unit 11 and the pipes of second unit 12 are connected. Specifically, first hot-water supply pipe 34a, first water supply pipe 35a, first drain pipe 36a, first air circulation duct 44a, first air supply and exhaust duct 45a, first refrigerant pipe 46a and first drain pipe 47a are connected to second hot-water supply pipe 34b, second water supply pipe 35b, second drain pipe 36b, second air circulation duct 44b, second air supply and exhaust duct 45b, second refrigerant pipe 46b and second drain pipe 47b, respectively.

In this case, first hot-water supply pipe 34a, first water supply pipe 35a and first drain pipe 36a are connected to second hot-water supply pipe 34b, second water supply pipe 35b and second drain pipe 36b, respectively, and as the respective continuous pipes, hot-water supply pipe 34, water supply pipe 35 and drain pipe 36 are formed. It is to be noted that multiple sets of hot-water supply pipe 34, water supply pipe 35 and drain pipe 36 may be provided as necessary.

Similarly, first air circulation duct 44a and second air circulation duct 44b are linked to form single upper and lower floor air circulation duct 44, and first air supply and exhaust duct 45a and second air supply and exhaust duct 45b are linked to form single air supply and exhaust duct 45. In addition, first refrigerant pipe 46a and second refrigerant pipe 46b are linked to form single refrigerant pipe 46, and first drain pipe 47a and second drain pipe 47b are linked to form single drain pipe 47. It is to be noted that cooling medium is filled and sealed in refrigerant pipe 46.

Like this, in this embodiment, hot-water supply pipe 34, water supply pipe 35, drain pipe 36, upper and lower floor air circulation duct 44, air supply and exhaust duct 45, refrigerant pipe 46 and drain pipe 47 are plumbed to the upper and lower floors so as to communicate with the upper and lower floors.

Also, the outdoor machines such as air conditioner outdoor machine 42, the hot-water suppliers (hot-water reservoir tank 60, hot-water supply outdoor machine 61) and power storage device 70 are installed outdoors. These outdoor machines are connected to the respective pieces of equipment at a building site. For instance, air conditioner outdoor machine 42 is connected to air conditioner 41 via refrigerant pipe 46 and drain pipe 47. Also, hot-water reservoir tank 60 is connected to the water-related equipment (such as a modular bath, a toilet, a washstand) via hot-water supply pipe 34. Power storage device 70 is connected to various pieces of electrical equipment via an electrical wire.

As illustrated in FIG. 3 to FIG. 5, building unit 1 has recessed portion 16 which is formed to be recessed toward the indoor side. Recessed portion 16 is a space area which is formed by denting part of a building structure included in building unit 1 toward the indoor side. The outdoor machines are installed in recessed portion 16. Specifically, air conditioner outdoor machine 42, the hot-water suppliers (hot-water reservoir tank 60, hot-water supply outdoor machine 61) and power storage device 70 are stored in recessed portion 16 so as to stay within the space of recessed portion 16. In this manner, recessed portion 16 can be used as a space for installing the outdoor machines for the housing equipment. Installation of the outdoor machines in recessed portion 16 can avoid reduction of free space in the site whereas the reduction is caused by installing the outdoor machines outdoors. Thus, free space in the site can be effectively used. As illustrated in FIG. 3, two air conditioner outdoor machines 42 are both disposed in recessed portion 16. However, one of the two is hidden inside of the outer wall and is disposed in engraved space that communicates with an upper portion of recessed portion 16.

In this embodiment, upper portion 18a is provided above recessed portion 16 as an upper face portion, and upper portion 18a functions as eaves. Thus, even when the outdoor machines are not provided with a hood, installation of the outdoor machines in recessed portion 16 can reduce exposure of the outdoor machines to wind, rain and direct sunlight.

As illustrated in FIG. 3 and FIG. 5, in this embodiment, recessed portion 16 is provided with door 19 that communicates with the indoor space. This allows going and coming between the indoor and outdoor spaces through door 19. Also, when an outdoor machine is installed in recessed portion 16, the outdoor machine carried indoors can be carried outdoors through the door. Therefore, even when it is not possible to carry an outdoor machine to recessed portion 16 from outdoors due to a small space between the outer wall of a house and the premises boundary, the outdoor machine can be carried from indoors to outdoors through door 19.

Here, the function and effect of upper and lower floor air circulation duct 44 in building unit 1 will be described.

First, the function of upper and lower floor air circulation duct 44 will be described using FIG. 8. FIG. 8 is a view schematically illustrating an air flow in a house which is built using building unit 1 according to the embodiment of the present invention.

As illustrated in FIG. 8, in building unit 1 according to the embodiment, there is installed upper and lower floor air circulation duct 44 that extends in a vertical direction so as to extend over first unit 11 and second unit 12. In other words, upper and lower floor air circulation duct 44 is a vertical ventilation duct that communicates with first unit 11 and second unit 12.

Also, upper and lower floor air circulation duct 44 is spatially connected to first unit 11 on the first floor and second unit 12 on the second floor through ventilation openings 22a and 22b. Consequently, vertical ventilation can be achieved, and thus it is possible to efficiently exhaust air in the entire house including the first floor and the second floor. It is to be noted that in FIG. 4, gas flow through upper and lower floor air circulation duct 44 is indicated by an arrow.

Figure 9A:
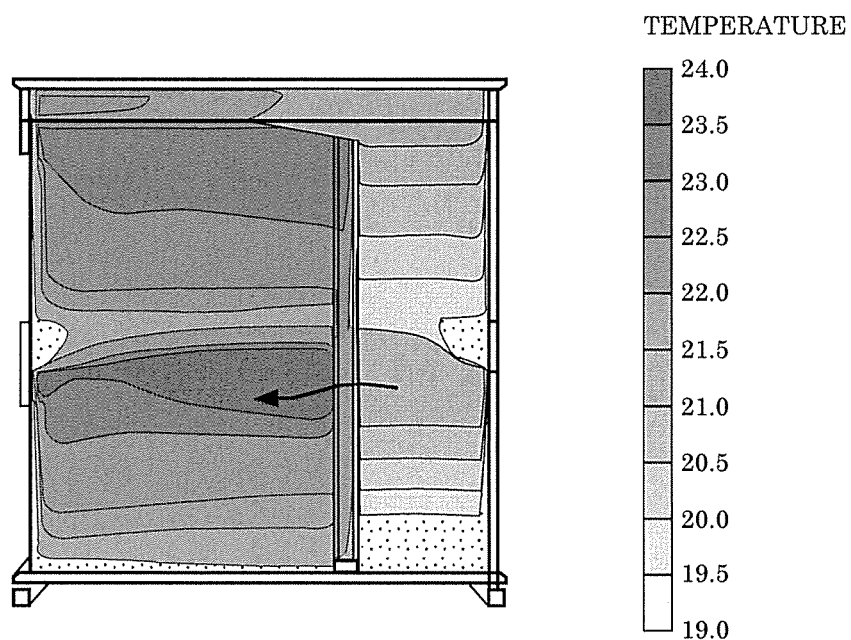
FIG. 9A is a view illustrating a temperature distribution in a house which is built using a building unit in which an upper and lower floor air circulation duct is not installed.
Figure 9B:
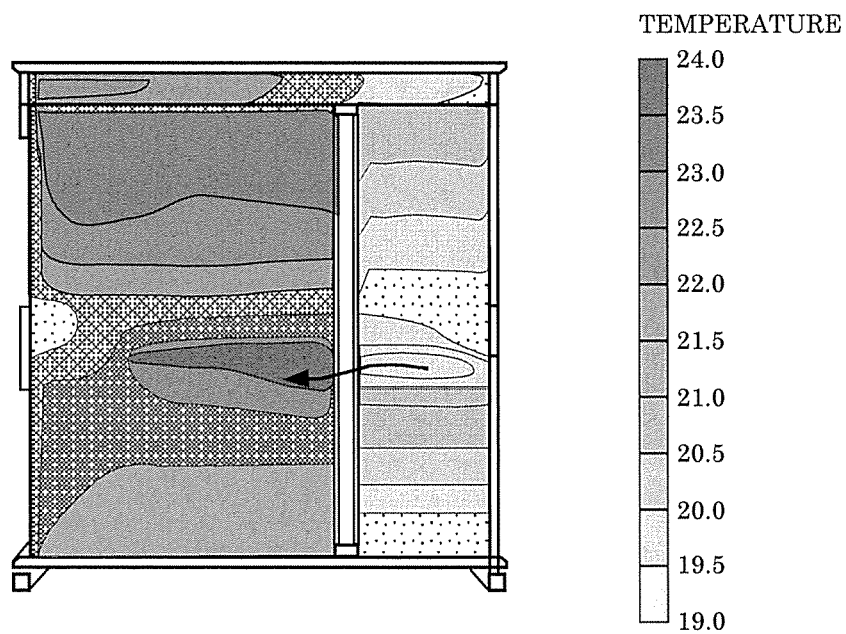
FIG. 9B is a view illustrating a temperature distribution in a house which is built using the building unit in which an upper and lower floor air circulation duct is installed and which is according to this embodiment.

Next, the effect of upper and lower floor air circulation duct 44 will be described using FIG. 9A and FIG. 9B. FIG. 9A is a view illustrating a temperature distribution in a house which is built using a building unit in which upper and lower floor air circulation duct 44 is not installed. FIG. 9B is a view illustrating a temperature distribution in a house which is built using building unit 1 in which upper and lower floor air circulation duct 44 is installed and which is according to this embodiment. FIG. 9A and FIG. 9B illustrate a temperature distribution when only one air conditioner is installed in a house and the volume of air set in a circulating fan separately installed is 500 m3/h.

As illustrated in FIG. 9A, when upper and lower floor air circulation duct 44 is not installed, a room temperature difference was observed between a room on the first floor and a room on the second floor. Moreover, in each of the room on the first floor and the room on the second floor, the temperature distribution in upper and lower portions (near the ceiling and near the floor) in the room is not even.

On the other hand, as illustrated in FIG. 9B, when upper and lower floor air circulation duct 44 is installed, the difference between the room temperature of the room on the first floor and the room temperature of the room on the second floor is reduced, and it was found that the temperatures in the upper and lower floors are uniformized. Furthermore, in each of the room on the first floor and the room on the second floor, the temperature difference between upper and lower portions (near the ceiling and near the floor) in the room is reduced, and it was found that the temperature distribution in the entire room is uniformized.

Since upper and lower floor air circulation duct 44 is thus installed in this embodiment, vertical ventilation can be achieved. Thus, the temperatures in the upper and lower floors can be uniformized and the room temperature in each of the upper and lower floors can also be uniformized. Consequently, the energy consumption of the air conditioning equipment can be reduced.

Furthermore, in this embodiment, upper and lower floor air circulation duct 44 is pre-mounted on building unit 1 in a factory and is pre-set. Specifically, first air circulation duct 44a is pre-mounted on first unit 11 in a factory, and second air circulation duct 44b is pre-mounted on second unit 12 in a factory.

Thus, pipe connection between first air circulation duct 44a and second air circulation duct 44b at a building site allows upper and lower floor air circulation duct 44 to be easily achieved as a vertical type duct. That is, when first unit 11 and second unit 12 are linked, first air circulation duct 44a and second air circulation duct 44b are also linked at the same time, and thus a vertical duct can be achieved by just linking first unit 11 and second unit 12.

Also, pre-setting upper and lower floor air circulation duct 44 in a factory allows piping with a shortest distance to be easily achieved.

Furthermore, compared with the case of construction on the site, pre-setting upper and lower floor air circulation duct 44 in a factory allows a variation in the quality to be reduced and higher quality to be achieved.

As described above, building unit 1 according to this embodiment has a space path that spatially communicates with first unit 11 and second unit 12.

Thus, equipment in common with the first unit and the second unit can be installed as desired in building unit 1 utilizing the space path.

The space path is, for instance, a vertical duct that extends in a vertical direction so as to extend over first unit 11 and second unit 12. In this embodiment, upper and lower floor air circulation duct 44 is installed as the vertical duct.

Thus, the temperatures in the upper and lower floors can be uniformized and the room temperature in each of the upper and lower floors can also be uniformized. Consequently, the energy consumption can be reduced.

In this embodiment, the space path is disposed in the vicinity of a face on the indoor side, out of four faces surrounding building structures 11a and 12a. Specifically, the space path is disposed in the vicinity of inner wall base material 13b provided in a face on the indoor side.

The space path is disposed on the indoor side in this manner, and thus coordination with a traditional construction method can be easily accomplished. Upper and lower floor air circulation duct 44 can be coordinated with a duct in accordance with a traditional construction method, for instance, by disposing upper and lower floor air circulation duct 44, that is, the space path on the indoor side. Alternatively, when the space path is used as a space for passing wires or used for piping, disposing the space path on the indoor side allows coordination with wiring and piping in accordance with a traditional construction method to be accomplished.

It is to be noted that although upper and lower floor air circulation duct 44 is given by a space path itself spatially communicating with first unit 11 and second unit 12 in this embodiment, the invention is not limited to this. For instance, a space path itself spatially communicating with first unit 11 and second unit 12, and upper and lower floor air circulation duct 44 are separate structures, and a duct such as upper and lower floor air circulation duct 44 may be disposed in the space path.

In this case, the space path is, for instance, the space area between two facing outer wall base materials 13a in building unit 1, or the space area between two facing inner wall base materials 13b.

Also, the space path spatially communicating with first unit 11 and second unit 12 may be provided in the vicinity of the water-related equipment. Thus, moisture generated in the vicinity of the water-related equipment can be exhausted via the space path.

In addition, in this embodiment, air supply and exhaust duct 45 is also formed as a space path that spatially communicates with first unit 11 and second unit 12. Specifically, air supply and exhaust duct 45 is obtained by connecting first air supply and exhaust duct 45a installed in first unit 11 and second air supply and exhaust duct 45b installed in second unit 12.

It is to be noted that as illustrated in FIG. 4, in this embodiment, first air supply and exhaust duct 45a and second air supply and exhaust duct 45b are connected, and air supply and exhaust duct 45 is a single duct. For this reason, only one total heat exchanger 43 is provided. However, the invention is not limited to this. For instance, as illustrated in FIG. 8, first air supply and exhaust duct 45a and second air supply and exhaust duct 45b may be separated, and installed as separate space paths. In this case, total heat exchanger 43 should be connected to each of first air supply and exhaust duct 45a and second air supply and exhaust duct 45b.

In this embodiment, the space path spatially communicating with first unit 11 and second unit 12 is used as a ventilation duct. However, the invention is not limited to this. For instance, the space path may be utilized as a space for a wire such as an electrical wire. In this case, an electrical wire or the like is disposed in the space path.

Figure 10:
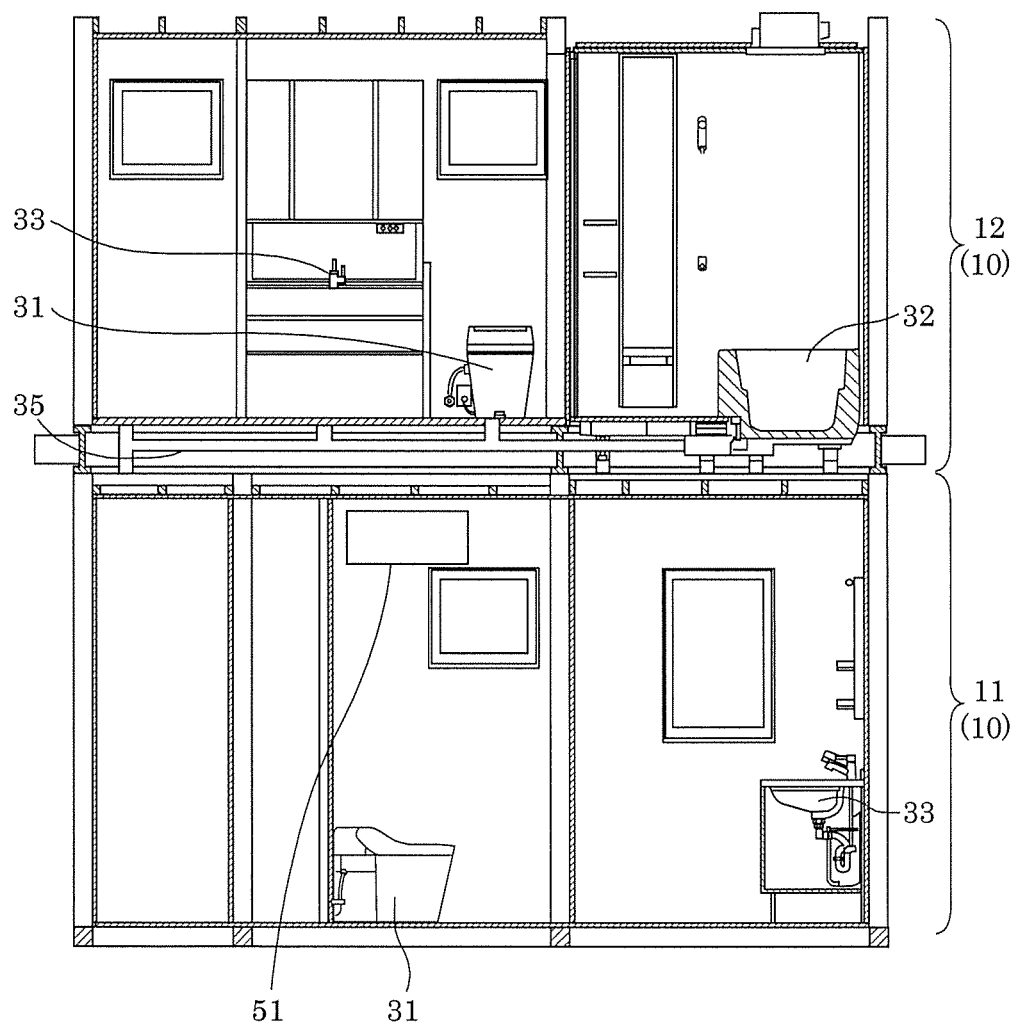
FIG. 10 is a sectional side view of the first unit and the second unit of a building unit according to a modification of the present invention.
Figure 11A:
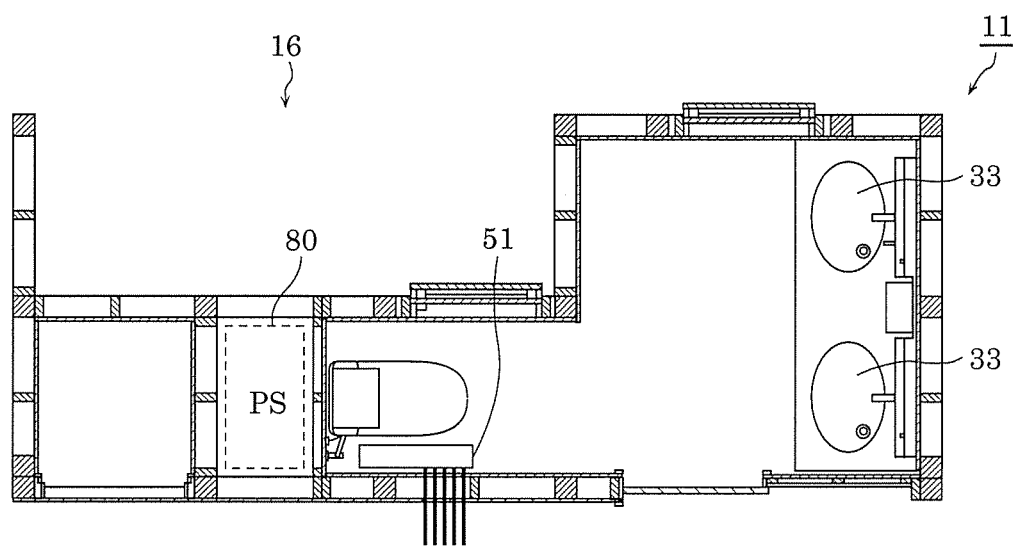
FIG. 11A is a sectional plan view of a first unit of the building unit according to the modification of the present invention.
Figure 11B:
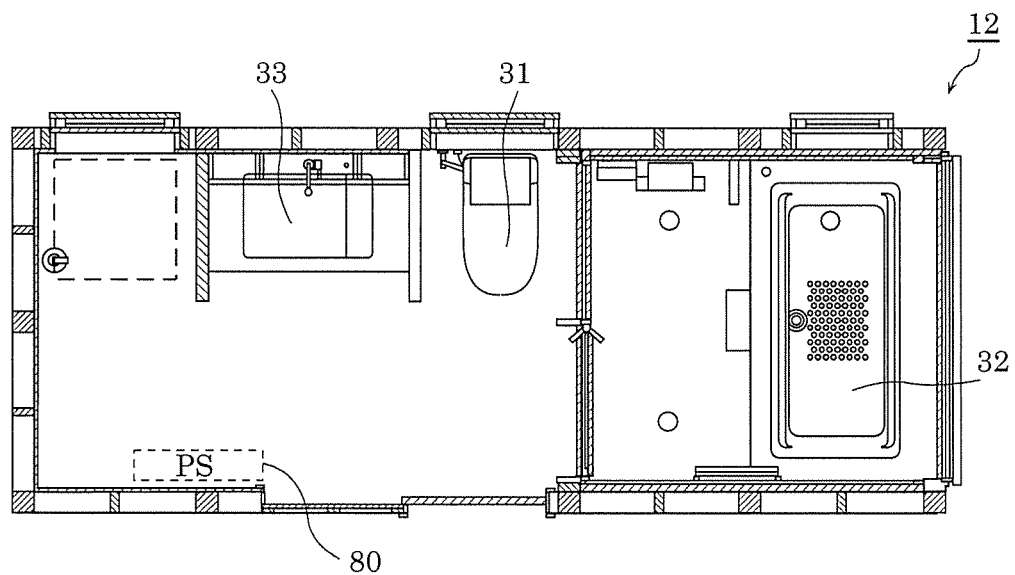
FIG. 11B is a sectional plan view of a second unit of the building unit according to the modification of the present invention.

Also, the structure of building unit 1 is not limited to the structure in the above-described embodiment. For instance, the structure of building unit 1 may be the structure as illustrated in FIG. 10, FIG. 11A and FIG. 11B. FIG. 10 is a sectional side view of the first unit and the second unit of a building unit according to a modification of the present invention. FIG. 11A is a sectional plan view of first unit 11 (first floor) of the building unit, and FIG. 11B is a sectional plan view of second unit 12 (second floor) of the building unit.

As illustrated in FIG. 10A and FIG. 11A, distribution board 51 (wiring equipment) may be installed in a face (inner wall face) on the indoor side of building structure 11a in first unit 11. Specifically, distribution board 51 is installed in a partition wall on the indoor side. Consequently, wiring connection from the outside of first unit 11 can be easily made, and thus members such as an empty pipe can be reduced.

It is to be noted that not only distribution board 51, but also wiring equipment other than distribution board 51 may be installed in a face on the indoor side of building structure 11a in first unit 11. Also, electrical equipment such as distribution board 51 may be installed in a face (inner wall face) on the indoor side of building structure 12a in second unit 12 not first unit 11.

Also, a space path spatially communicating with first unit 11 and second unit 12 may be installed in a ceiling bosom 29 (see, FIG. 7) of recessed portion 16 which is formed to be recessed toward the indoor side. In this case, as illustrated in FIG. 11A and FIG. 11B, pipe space (PS) 80, which communicates with the ceiling bosom of recessed portion 16, may be installed in first unit 11 and second unit 12. Consequently, a wire and a pipe from first unit 11 and second unit 12 can be easily linked to the equipment disposed in recessed portion 16.

As illustrated in FIG. 10, water supply pipe 35 may be disposed in the ceiling bosom of recessed portion 16. Other pipes such as a water distribution pipe or a hot-water supply pipe may be disposed in the ceiling bosom of recessed portion 16.

It is to be noted that in the embodiment and the modification, the outer surface side of first unit 11 and second unit 12 may be provided with no surface material. Thus, it is possible to prevent damage in the work at the time of transportation, at the time of installation and after construction (in other words, at the time other than the time of manufacture of first unit 11 and second unit 12), and connection between first unit 11 and the foundation and connection between first unit 11 and second unit 12 can be easily made.

Also, in the embodiment and the modification, in first unit 11 and second unit 12, upper floor beam is composed of metal and upper and lower wood, and the metal may be provided with a round hole. Thus, a duct with a large diameter and a drain pipe path can be separated, and the bosom of first unit 11 and second unit 12 can be reduced. Therefore, height of first unit 11 and second unit 12 can be suppressed low.

(Building)

Figure 12:
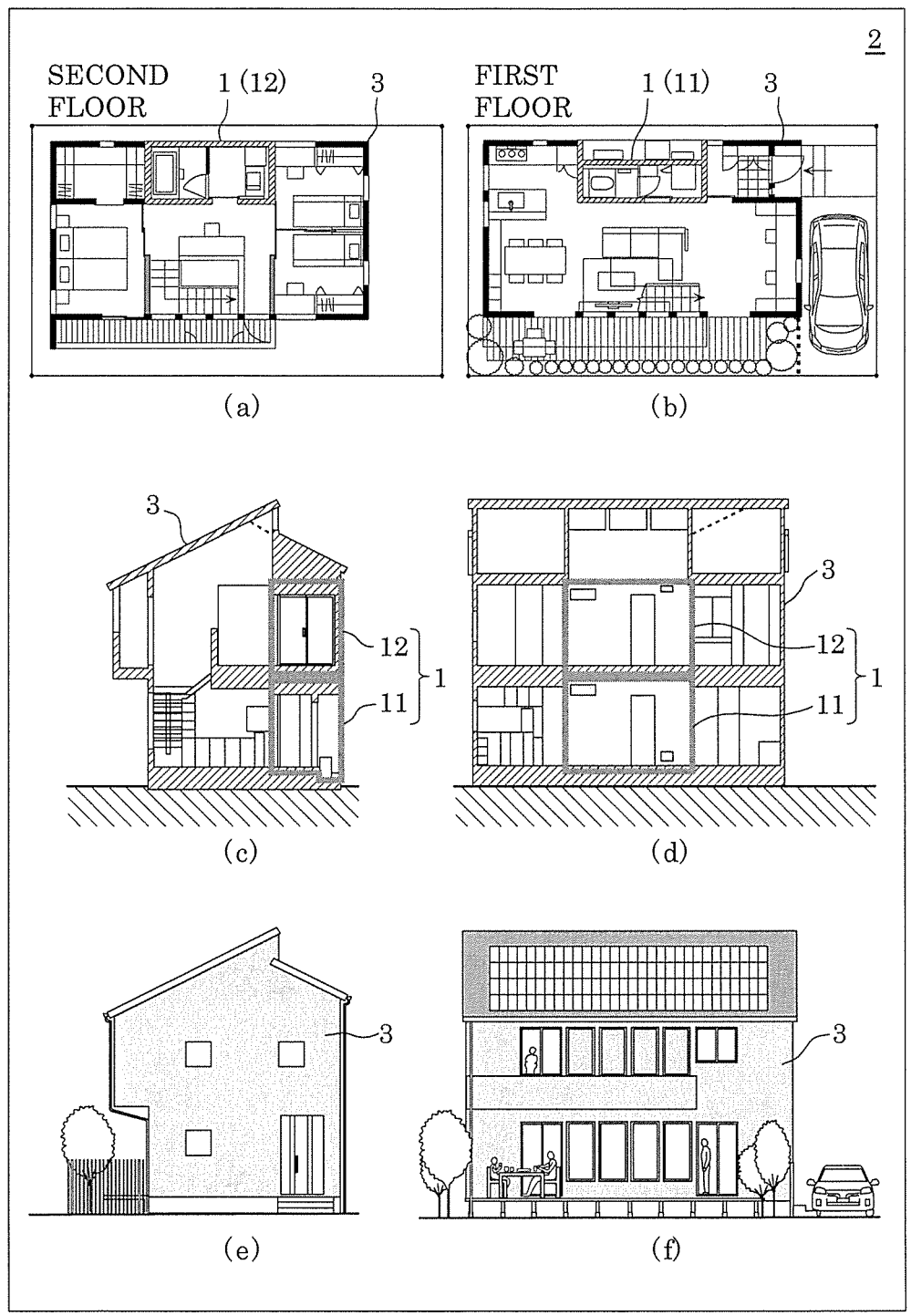
FIG. 12 provides views illustrating the configuration of a building according to the embodiment of the present invention.

Next, an example of the configuration of building 2 according to the embodiment of the present invention will be described using FIG. 12. FIG. 12 provides views illustrating the configuration of a building according to the embodiment of the present invention, (a) is a plan view of the second floor, (b) is a plan view of the first floor, (c) is a sectional side view, (d) is a sectional front view, (e) is a side view, and (f) is a front view.

Building 2 is a typical house which is built in the housing site, for instance. As illustrated in FIG. 12, building 2 includes building unit 1 which is transported and installed at a building site, and building structure 3 which is constructed at the building site based on building unit 1 as the core.

Building structure 3 is constructed by a traditional construction method. In other words, units other than building unit 1 are constructed by a traditional construction method.

It is to be noted that building unit 1 is provided in a central portion on the back side of building 2 as illustrated in FIG. 12. However, building unit 1 may be provided at a corner of building 2.

(Method of Constructing Building Using Building Unit)

Next, a method of constructing building 2 using building unit 1 according to the embodiment of the present invention will be described using FIG. 13A to FIG. 13F. FIG. 13A to FIG. 13F are views for explaining a method of constructing a building using the building unit according to the embodiment of the present invention. In each of FIG. 13A to FIG. 13F, (a) is a plan view, (b) is a front view, and (c) is a side view. It is to be noted that similarly to FIG. 10, building 2 is a typical house.

First, each of first unit 11 and second unit 12 is pre-assembled in a factory or the like. Each of first unit 11 and second unit 12 is then transported from the factory to a building site by a delivery vehicle such as a truck or a trailer. First unit 11 and second unit 12 are transported on a unit-by-unit basis in this manner, and thus even when the units are transported by a delivery vehicle such as a truck, the units can be transported without exceeding the height restriction imposed by the Road Traffic Act.

Figure 13A:
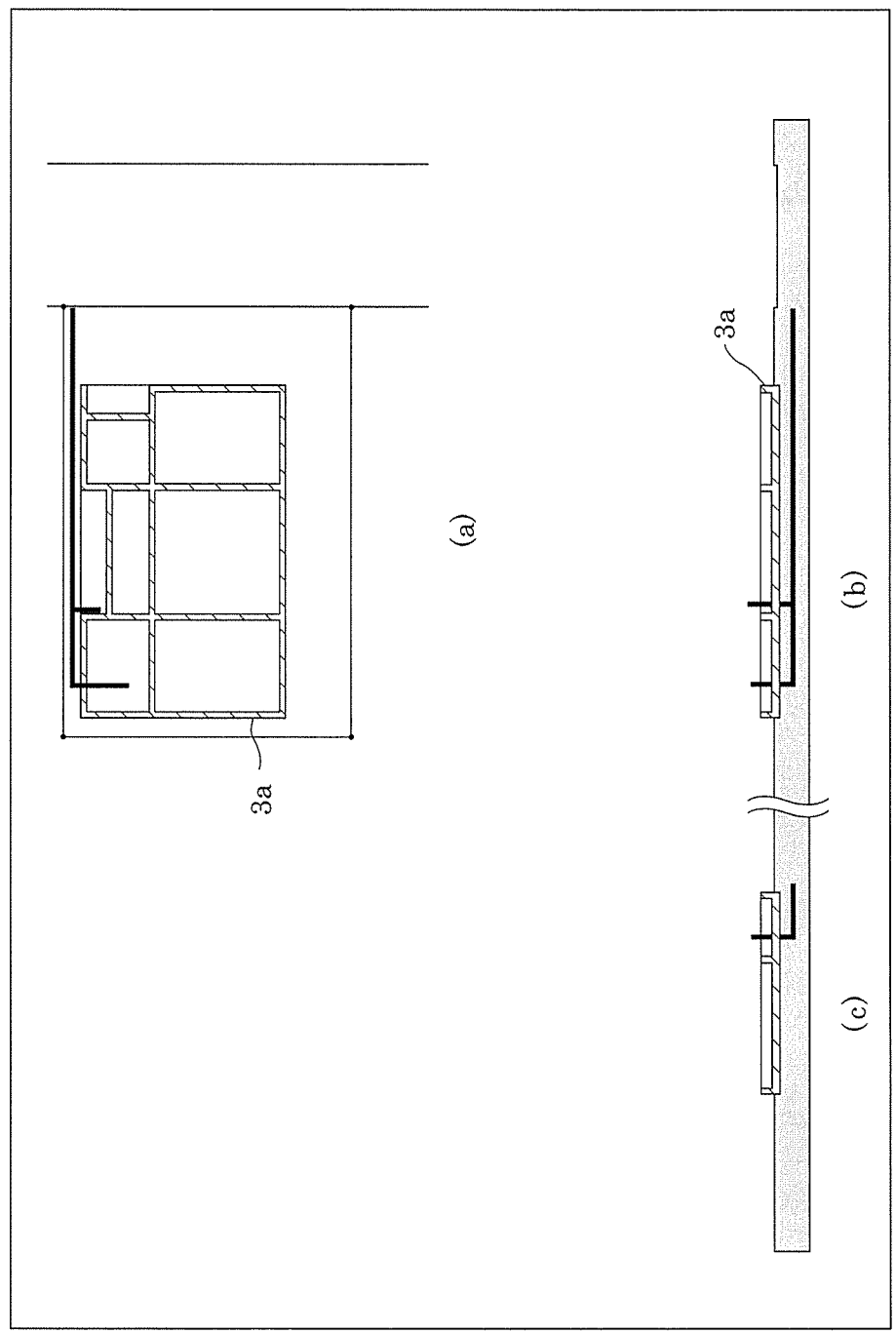
FIG. 13A is a view for explaining a foundation work in a construction system for the building according to the embodiment of the present invention.

As illustrated in FIG. 13A, foundation work is performed at the building site, and foundation 3a is built in the housing site. In addition, piping work outdoors is also performed. It is to be noted that an anchor bolt is fixed to foundation 3a.

Figure 13B:
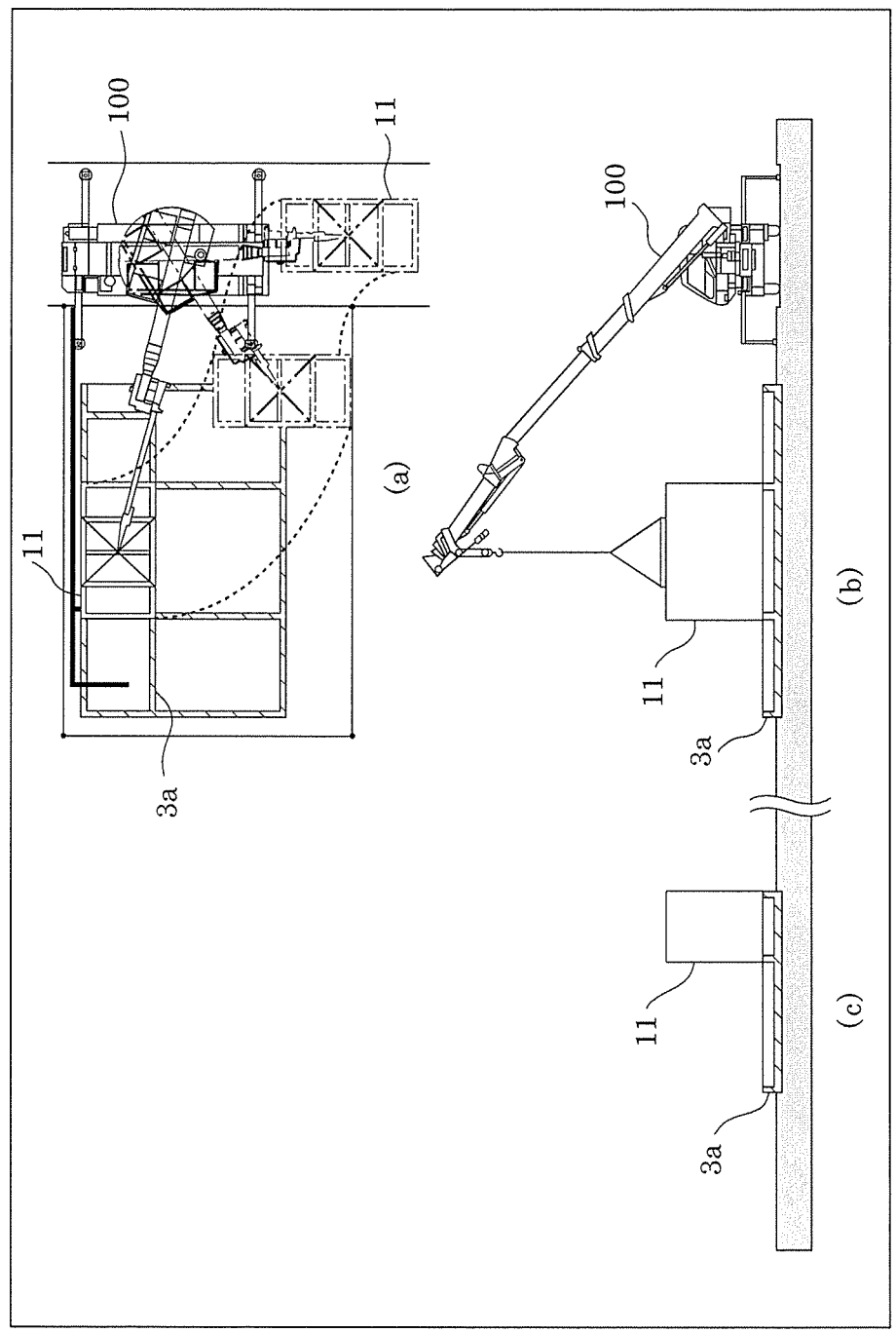
FIG. 13B is a view for explaining a first unit installation work in the construction system for the building according to the embodiment of the present invention.

Next, as illustrated in FIG. 13B, first unit 11 transported to the building site is installed at a predetermined position of foundation 3a by crane 100. At this point, first unit 11 is fixed to the anchor bolt of foundation 3a.

Figure 13C:
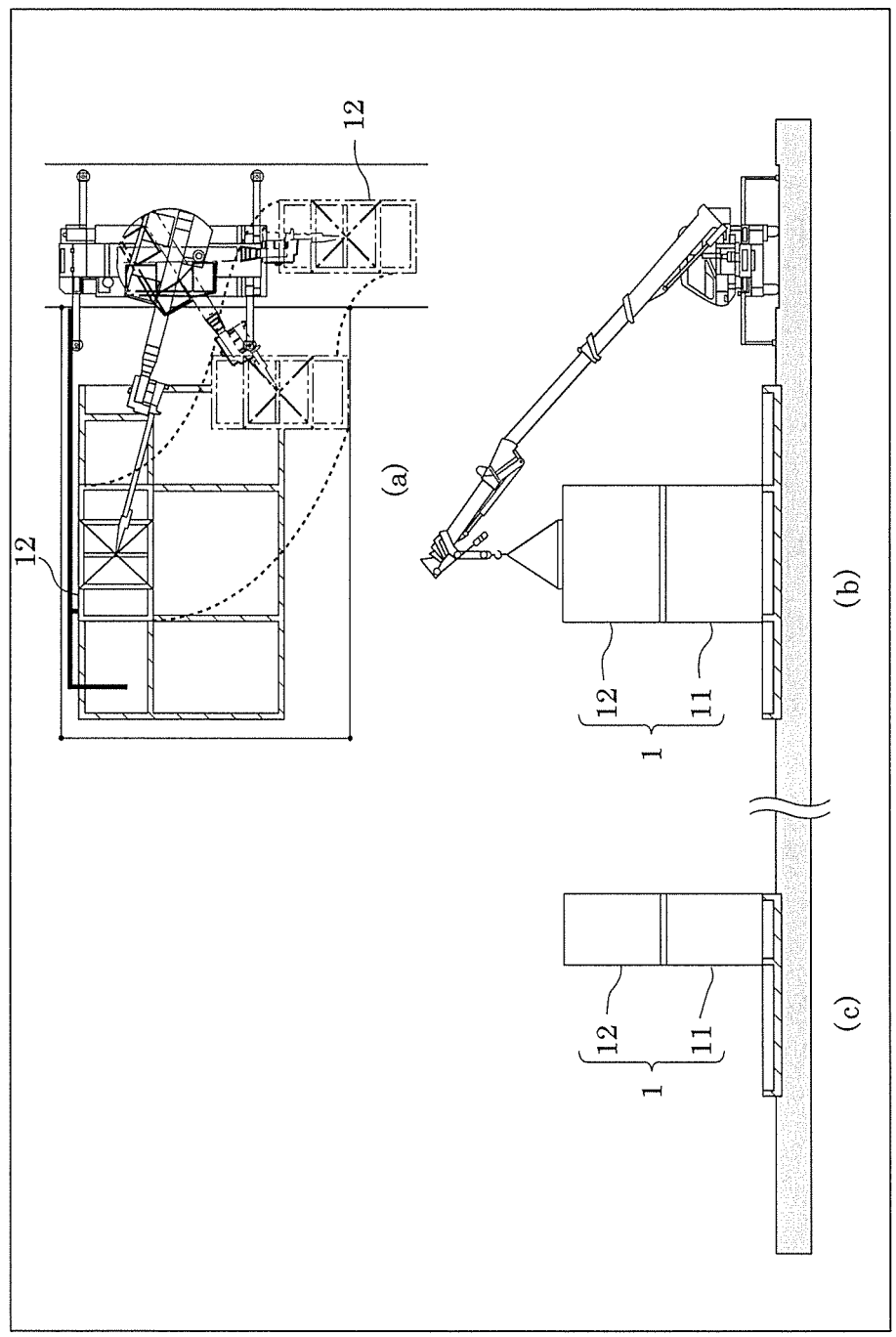
FIG. 13C is a view for explaining a second unit installation work in the construction system for the building according to the embodiment of the present invention.

Next, as illustrated in FIG. 13C, second unit 12 is installed on first unit 11 by crane 100. At this point, first unit 11 and second unit 12 are linked and fixed using a bolt. Consequently, building unit 1 is completed on foundation 3a.

Figure 13D:
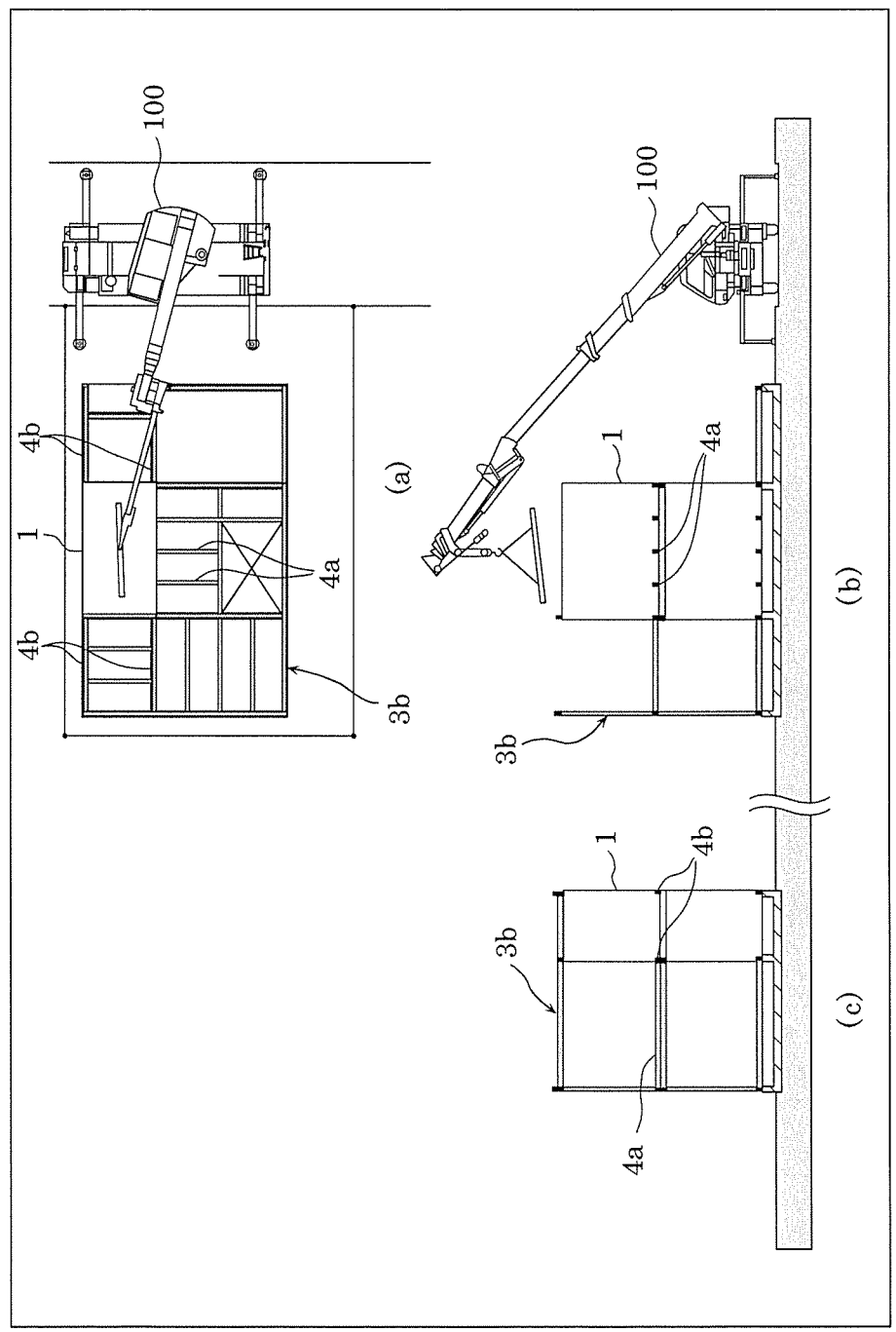
FIG. 13D is a view for explaining a building structure work in the construction system for the building according to the embodiment of the present invention.

Next, as illustrated in FIG. 13D, building structures constituting a house are constructed based on building unit 1 as the core. The building structures in this embodiment are constructed by the wooden framework construction method. Specifically, construction materials 3b such as pillars and beams are installed and fixed to foundation 3a by crane 100. At this point, beams 4a and 4b are linked to second unit 12 using beams 4a and 4b are as the construction materials 3b. In addition, a floor board is also installed.

Figure 13E:
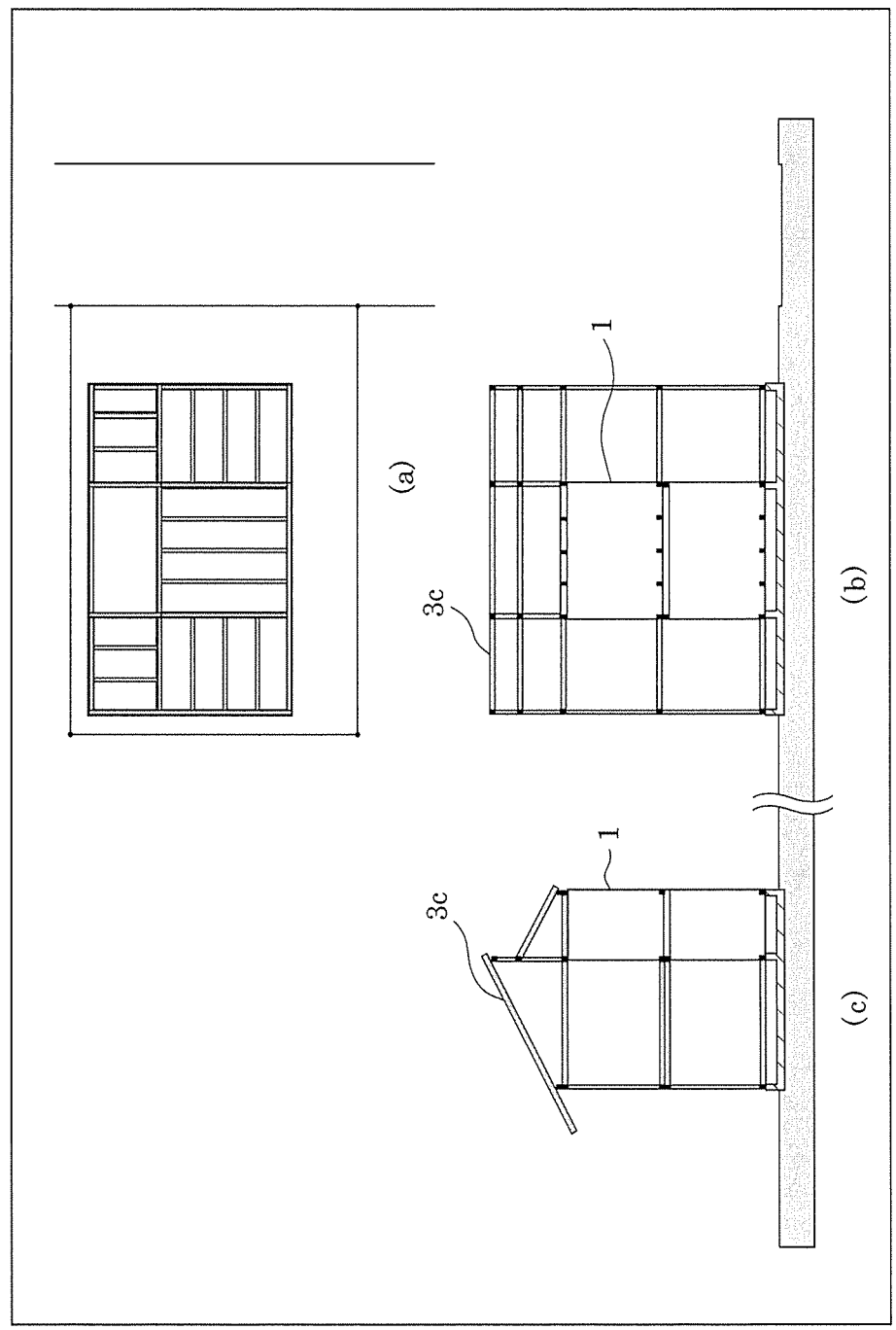
FIG. 13E is a view for explaining a roof work (completion of construction) in the construction system for the building according to the embodiment of the present invention.

Next, as illustrated in FIG. 13E, roof work is performed and roof 3c is installed on construction material 3a such as a beam and building unit 1. In addition, construction such as outer wall work is also performed, and an outer wall is installed in the building structures.

Figure 13F:
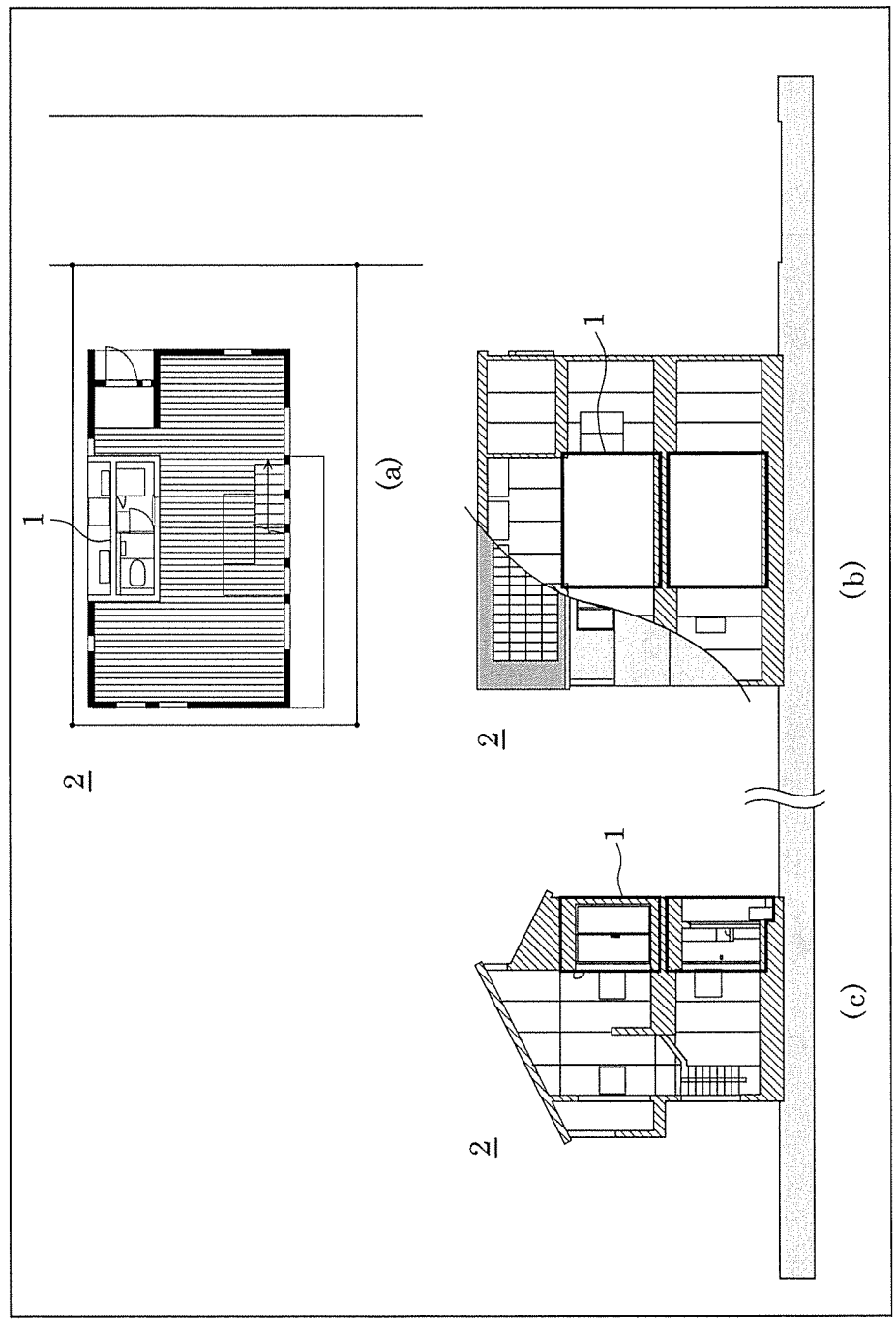
FIG. 13F is a view for explaining a periphery work in the construction system for the building according to the embodiment of the present invention.

Next, as illustrated in FIG. 13F, periphery work such as interior construction and equipment work is performed. Thus, building 2 is completed. Also, outdoor machines are installed and connected to the equipment of building 2.

MODIFICATIONS

The building unit and building according to the present invention have been described based on the embodiment above. However, the present invention is not limited to these embodiments.

For instance, in the embodiment, although hot-water supply pipe 34, water supply pipe 35, drain pipe 36, upper and lower floor air circulation duct 44, refrigerant pipe 46 and drain pipe 47 are separated into two between first unit 11 and second unit 12, each pipe may be a single pipe without being separated.

In the embodiment, building unit 1 has a configuration such that two units, that is, first unit 11 and second unit 12 are stacked one on top of the other. However, the invention is not limited to this. For instance, building unit 1 may be such that three or more units are stacked, multiple units may be two-dimensionally disposed, or a combination of these may be made.

In the embodiment, for building unit 1, home electric appliances of air conditioner 41 and air conditioner outdoor machine 42, and washing machine 37 are pre-installed in a factory. However, the invention is not limited to this. For instance, the home electric appliances are not necessarily installed in building 2 in a factory, and may be mounted after building 2 is completed. Even when pre-installation is done in a factory, the home electric appliances are not limited to air conditioner 41 and washing machine 37, and other home electric appliances may be pre-installed in a factory. In particular, pre-installation of home electric appliances from the same manufacturer in a factory allows the quality and function of the whole building unit 1 to be improved and the cost to be reduced.

Also, in the embodiment, a description has been given by using an electrical hot-water supplier as an example of a hot-water supplier (hot-water supply system). However, the invention is not limited to this. For instance, as a hot-water supplier, instead of an electrical hot-water supplier, a fuel cell hot-water supplier or a gas hot-water supplier may be used.

In the embodiment, the construction method for building unit 1 and building 2 is the wooden framework construction method. However, without being limited to this, other construction method (structure method) such as framing, 2×4 construction method, or steel frame may be used.

In addition, embodiments obtained by applying various modifications, which occur to those skilled in the art, to the aforementioned embodiments, and embodiments obtained by combining the components and functions in the aforementioned embodiments in any manner within a scope not departing from the spirit of the present invention are also included in the present invention.

REFERENCE MARKS IN THE DRAWINGS

1 building unit
2 building
3 building structure
11 first unit
12 second unit
31 toilet
32 modular bath (bath)
33 washstand
37 washing machine
43 total heat exchanger (heat exchanger)
44 upper and lower floor air circulation duct (duct, space path)
44a first air circulation duct (first duct)
44b second air circulation duct (second duct)
45 air supply and exhaust duct

The invention claimed is:

1. A building unit that constitutes part of a two or more story building, the building unit comprising:
a first unit that constitutes one of a plurality of floors;
a second unit that constitutes a floor above the first unit out of the plurality of floors; and
a space path that is disposed in the first unit and the second unit,
wherein the first unit and the second unit each include a building structure having a first wall, and the space path is arranged on an interior side of the first wall,
the space path includes an upper and lower floor air circulation duct that is installed to extend over the first unit and the second unit, and an air supply and exhaust duct that is installed to extend over the first unit and the second unit,
the upper and lower floor air circulation duct is a circulation duct which includes a circulation fan,
the air supply and exhaust duct is connected to a ventilation opening via a total heat exchanger, the ventilation opening being provided in the second unit and communicating with an outdoor space,
the upper and lower floor air circulation duct includes a first air circulation duct installed in the first unit and a second air circulation duct installed in the second unit,
the first air circulation duct and the second air circulation duct are connected at a portion linking the first unit and the second unit,
the first air circulation duct communicates with an indoor space of the first unit and the second air circulation duct communicates with an indoor space of the second unit,
at least one of the first air circulation duct and the second air circulation duct communicates with an outdoor space of at least one of the first unit and the second unit,
the air supply and exhaust duct includes a first air supply and exhaust duct installed in the first unit and a second air supply and exhaust duct installed in the second unit,
the first air supply and exhaust duct and the second air supply and exhaust duct are connected at the portion linking the first unit and the second unit,
the first air supply and exhaust duct communicates with the indoor space and an outdoor space of the first unit and the second air supply and exhaust duct communicates with the indoor space and an outdoor space of the second unit, and the upper and lower floor air circulation duct and the air supply and exhaust duct are spatially connected, and wherein the first unit has a ceiling bosom and a recessed portion defining the outdoor space, a part of the ceiling bosom being arranged above the recessed portion, the ceiling bosom includes a space between a ceiling base sheet of the first unit and an upper beam of the first unit, and the space path is disposed to pass through the part of the ceiling bosom.

2. The building unit according to claim 1,
wherein each building structure has at least a second, third and fourth wall and is surrounded by the first, second, third and fourth walls, the first, second, third and fourth walls each include a face on an outdoor side serving as an outer wall face, and a face on an indoor side serving as an inner wall face, and the space path is disposed in a vicinity of the face on the indoor side.

3. The building unit according to claim 2,
wherein a distribution board is installed in the face on the indoor side of one of the first unit and the second unit.

4. The building unit according to claim 1,
wherein an electrical wire is installed in the space path.

5. The building unit according to claim 1,
wherein the building unit further comprises a duct space area, in which the duct is installed, and wherein the duct space area extends in a vertical direction over the first unit and the second unit.

6. The building unit according to claim 1, further comprising water-related equipment, wherein the water-related equipment includes at least one of a bath, a toilet, a washstand, a kitchen, or a hot-water supplier, and the space path is provided in a vicinity of the water-related equipment.

7. A building comprising:
the building unit according to claim 1 installed at a building site; and a roof unit constructed on the building unit at the building site.

8. The building unit according to claim 1, wherein each of the upper and lower floor air circulation duct and the air supply and exhaust duct vertically extends from the first unit to the second unit.

* * * * *